United States Patent
Kim et al.

(10) Patent No.: US 9,391,469 B2
(45) Date of Patent: Jul. 12, 2016

(54) APPARATUS AND METHOD FOR TRANSMITTING POWER AND TRANSCEIVING DATA USING MUTUAL RESONANCE, AND APPARATUS AND METHOD FOR RECEIVING POWER AND TRANSCEIVING DATA USING MUTUAL RESONANCE

(71) Applicant: SAMSUNG ELECTRONICS CO., LTD., Suwon-si (KR)

(72) Inventors: Dong Zo Kim, Yongin-si (KR); Sang Wook Kwon, Seongnam-si (KR); Ki Young Kim, Yongin-si (KR); Nam Yun Kim, Seoul (KR); Bong Chul Kim, Seoul (KR); Yun Kwon Park, Dongducheon-si (KR); Jae Hyun Park, Yongin-si (KR); Keum Su Song, Seoul (KR); Chi Hyung Ahn, Suwon-si (KR); Young Ho Ryu, Yongin-si (KR); Chang Wook Yoon, Seoul (KR); Byoung Hee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 14/073,025

(22) Filed: Nov. 6, 2013

(65) Prior Publication Data

US 2014/0197783 A1    Jul. 17, 2014

(30) Foreign Application Priority Data

Jan. 14, 2013 (KR) .................. 10-2013-0003974

(51) Int. Cl.
*H02J 17/00* (2006.01)
*H02J 7/02* (2016.01)
(Continued)

(52) U.S. Cl.
CPC ............... *H02J 7/025* (2013.01); *H02J 7/0004* (2013.01); *H02J 7/0077* (2013.01); *H01F 2038/143* (2013.01); *H02J 5/005* (2013.01); *H02J 7/0052* (2013.01); *Y02T 90/122* (2013.01)

(58) Field of Classification Search
CPC ........ H02J 7/025; H02J 5/005; Y02T 90/122; H04B 5/0081
USPC ........................................... 320/108
See application file for complete search history.

(56) References Cited

U.S. PATENT DOCUMENTS 8,106,539 B2 *  1/2012  Schatz ............... B60L 11/007
                                                  307/104
8,803,366 B2 *  8/2014  Proud ................. H01F 38/14
                                                  307/104

(Continued)

FOREIGN PATENT DOCUMENTS

KR  10-2008-0031391 A   4/2008
KR  10-2011-0009227 A   1/2011

(Continued)

*Primary Examiner* — Helen Rossoshek
(74) *Attorney, Agent, or Firm* — NSIP Law

(57) ABSTRACT

An apparatus configured to transmit power, and transceive data, using mutual resonance, includes a power transmitter configured to wirelessly transmit power to a device, using a power transmission frequency as a resonant frequency. The apparatus further includes a communication unit configured to transceive data to and from the device, using a communication frequency as a resonant frequency. The apparatus further includes a controller configured to determine a charging state of the device based on the data received from the device, and control an amount of the power based on the charging state.

24 Claims, 25 Drawing Sheets

(51) Int. Cl.
*H02J 5/00* (2016.01)
*H02J 7/00* (2006.01)
*H01F 38/14* (2006.01)

(56) References Cited

U.S. PATENT DOCUMENTS

| | | | |
|---|---|---|---|
| 9,065,488 B2* | 6/2015 | Kim et al. | |
| 9,213,932 B2* | 12/2015 | Kwon | G06K 19/0712 |
| 2005/0052282 A1* | 3/2005 | Rodgers et al. | 340/572.1 |
| 2010/0036773 A1* | 2/2010 | Bennett | 705/67 |
| 2010/0151808 A1* | 6/2010 | Toncich et al. | 455/226.3 |
| 2010/0217553 A1 | 8/2010 | Von Novak et al. | |
| 2010/0253281 A1* | 10/2010 | Li | 320/108 |
| 2011/0127953 A1* | 6/2011 | Walley et al. | 320/108 |
| 2011/0266881 A1* | 11/2011 | Kim | H02J 5/005 307/104 |
| 2012/0114052 A1 | 5/2012 | Haartsen | |
| 2012/0164943 A1* | 6/2012 | Bennett | 455/41.1 |
| 2012/0217819 A1* | 8/2012 | Yamakawa et al. | 307/104 |
| 2012/0262002 A1* | 10/2012 | Widmer | H02J 7/025 307/104 |
| 2012/0281547 A1* | 11/2012 | Kim | H04B 5/0031 370/242 |
| 2012/0286726 A1* | 11/2012 | Kim et al. | 320/108 |
| 2012/0293009 A1* | 11/2012 | Kim et al. | 307/104 |
| 2012/0293118 A1* | 11/2012 | Kim et al. | 320/108 |
| 2012/0306269 A1* | 12/2012 | Kim | H02J 7/025 307/11 |
| 2012/0306284 A1* | 12/2012 | Lee et al. | 307/104 |
| 2012/0306285 A1* | 12/2012 | Kim | H02J 17/00 307/104 |
| 2012/0306286 A1* | 12/2012 | Kim et al. | 307/104 |
| 2012/0306287 A1* | 12/2012 | Kim | H02J 17/00 307/104 |
| 2012/0306433 A1* | 12/2012 | Kim et al. | 320/106 |
| 2012/0309306 A1* | 12/2012 | Kim et al. | 455/41.1 |
| 2012/0309308 A1* | 12/2012 | Kim et al. | 455/41.1 |
| 2013/0015812 A1* | 1/2013 | Boyer et al. | 320/108 |
| 2013/0033117 A1* | 2/2013 | Kim | H02J 5/005 307/104 |
| 2013/0033118 A1* | 2/2013 | Karalis et al. | 307/104 |
| 2013/0035034 A1* | 2/2013 | Kim et al. | 455/41.1 |
| 2013/0035126 A1* | 2/2013 | Kim et al. | 455/509 |
| 2013/0058379 A1* | 3/2013 | Kim et al. | 375/146 |
| 2013/0093254 A1* | 4/2013 | Urano | 307/104 |
| 2013/0099587 A1* | 4/2013 | Lou et al. | 307/104 |
| 2013/0113298 A1* | 5/2013 | Ryu et al. | 307/104 |
| 2013/0154553 A1* | 6/2013 | Steele | 320/108 |
| 2013/0175874 A1* | 7/2013 | Lou | H04B 5/0093 307/104 |
| 2013/0300206 A1* | 11/2013 | Kim | H04B 5/0037 307/104 |
| 2014/0002015 A1* | 1/2014 | Tripathi et al. | 320/108 |
| 2014/0021796 A1* | 1/2014 | Song | H01F 38/14 307/104 |
| 2014/0021798 A1* | 1/2014 | Kesler | H02J 17/00 307/104 |
| 2014/0077613 A1* | 3/2014 | Song | H01F 38/14 307/104 |
| 2014/0077614 A1* | 3/2014 | Park et al. | 307/104 |
| 2014/0142876 A1* | 5/2014 | John | H02J 5/005 702/60 |
| 2014/0152251 A1* | 6/2014 | Kim et al. | 320/108 |
| 2014/0183967 A1* | 7/2014 | Ryu | B60L 11/182 307/104 |
| 2014/0203895 A1* | 7/2014 | Park | H01P 7/00 333/219 |
| 2014/0249825 A1* | 9/2014 | Proud | 704/275 |
| 2014/0265614 A1* | 9/2014 | Kim et al. | 307/104 |
| 2014/0285139 A1* | 9/2014 | Ahn et al. | 320/108 |
| 2014/0340033 A1* | 11/2014 | Kim et al. | 320/108 |
| 2014/0375137 A1* | 12/2014 | Ichikawa | 307/104 |
| 2015/0022012 A1* | 1/2015 | Kim et al. | 307/104 |
| 2015/0022013 A1* | 1/2015 | Kim et al. | 307/104 |
| 2015/0042169 A1* | 2/2015 | Park et al. | 307/104 |
| 2015/0069854 A1* | 3/2015 | Kim et al. | 307/104 |
| 2015/0076921 A1* | 3/2015 | Park | H02J 17/00 307/104 |
| 2015/0123679 A1* | 5/2015 | Kuyvenhoven et al. | 324/652 |
| 2015/0372495 A1* | 12/2015 | McCauley | H02J 5/005 307/104 |

FOREIGN PATENT DOCUMENTS

| | | |
|---|---|---|
| KR | 10-2011-0033279 A | 3/2011 |
| KR | 10-2011-0086630 A | 7/2011 |
| KR | 10-1065738 B1 | 9/2011 |
| KR | 10-2011-0134969 A | 12/2011 |
| KR | 10-2012-0050011 A | 5/2012 |

* cited by examiner

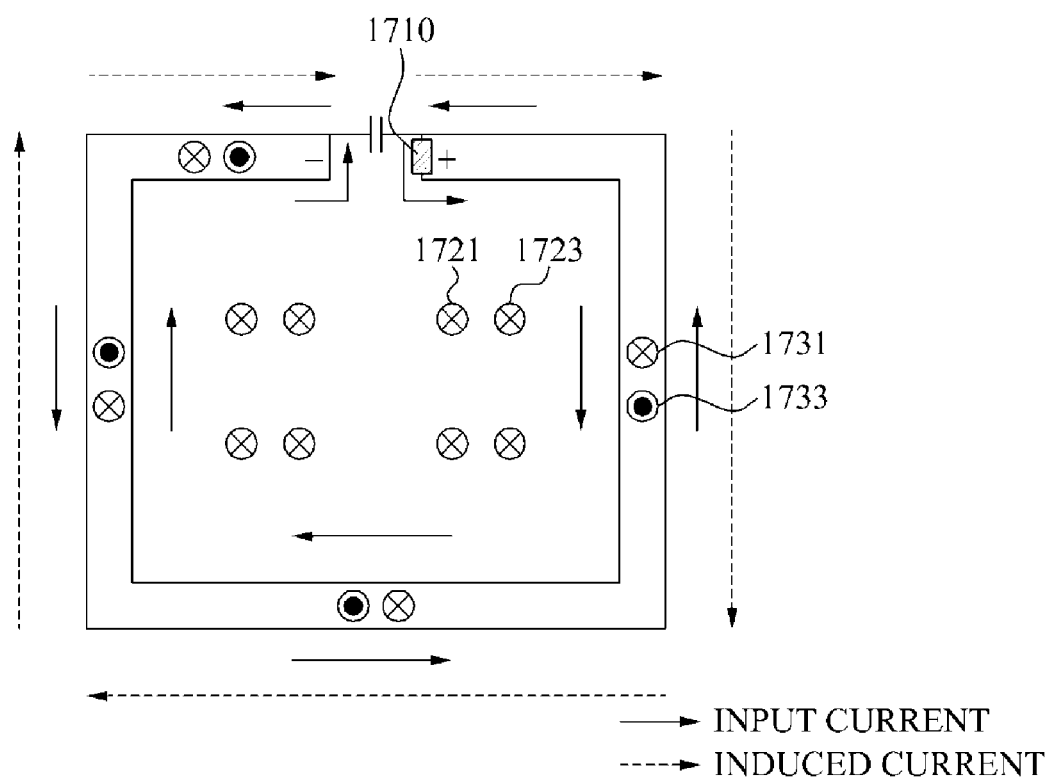

APPARATUS AND METHOD FOR TRANSMITTING POWER AND TRANSCEIVING DATA USING MUTUAL RESONANCE, AND APPARATUS AND METHOD FOR RECEIVING POWER AND TRANSCEIVING DATA USING MUTUAL RESONANCE

CROSS-REFERENCE TO RELATED APPLICATION

This application claims the benefit under 35 USC 119(a) of Korean Patent Application No. 10-2013-0003974, filed on Jan. 14, 2013, in the Korean Intellectual Property Office, the entire disclosures of which is incorporated herein by reference for all purposes.

BACKGROUND

1. Field

The following description relates to an apparatus and method for wirelessly transmitting and receiving both power and data using mutual resonance.

2. Description of Related Art

Research on wireless power transmission has been started to overcome an increase in inconveniences of wired power supplies, or the limited capacity of conventional batteries, due to an explosive increase in various electronic devices including electric vehicles, mobile devices, and the like. One of wireless power transmission technologies uses resonance characteristics of radio frequency (RF) devices. For example, a wireless power transmission system using resonance characteristics may include a source device configured to supply power, and a target device configured to receive the supplied power.

SUMMARY

In one general aspect, an apparatus configured to transmit power, and transceive data, using mutual resonance, includes a power transmitter configured to wirelessly transmit power to a device, using a power transmission frequency as a resonant frequency. The apparatus further includes a communication unit configured to transceive data to and from the device, using a communication frequency as a resonant frequency. The apparatus further includes a controller configured to determine a charging state of the device based on the data received from the device, and control an amount of the power based on the charging state.

The power transmitter may include a first frequency generating unit configured to generate the power transmission frequency, and a first power amplifier (PA) configured to amplify an amplitude of a signal with the power transmission frequency. The power transmitter may further include a first source resonator configured to transmit power corresponding to the amplified amplitude, to a target resonator of the device that resonates at the power transmission frequency.

The communication unit may include a second frequency generating unit configured to generate the communication frequency, and a second PA configured to amplify an amplitude of a signal with the communication frequency. The communication unit may further include a second source resonator configured to receive load-modulated data from a target resonator of the device that resonates at the communication frequency. The communication unit may further include a demodulator configured to demodulate the load-modulated data based on a variation in the amplitude of the signal with the communication frequency in response to mutual resonance occurring between the second source resonator and the target resonator.

The communication unit may further include a modulator configured to modulate data by changing a waveform of the signal with the communication frequency. The second source resonator may be configured to transmit the modulated data to the target resonator.

The communication frequency may be greater than twice, or less than half, the power transmission frequency.

The power transmitter may include a first source resonator configured to transmit the power to a first target resonator of the device that resonates at the power transmission frequency. The communication unit may include a second source resonator configured to transceive the data to and from a second target resonator of the device that resonates at the communication frequency. The first source resonator may include a higher quality factor than a quality factor of the second source resonator, and each of the first source resonator and the second source resonator may include a shape of a loop.

The second source resonator may include the same shape of the loop as the shape of the loop of the first source resonator, include a same pattern line of the loop as a pattern line of the loop of the first source resonator, and be located within a predetermined distance from the first source resonator.

The apparatus may further include a filter configured to block the power transmission frequency of the first source resonator, to prevent a magnetic field from being induced from the first source resonator to the second source resonator.

The apparatus may further include a filter configured to pass the communication frequency of the second source resonator, to prevent a magnetic field from being induced from the first source resonator to the second source resonator.

The controller may include a detector configured to detect whether the device exists based on whether the data is received. The controller may be configured to control the amount of the power so that wake-up power is transmitted until the device is detected to exist, and charging power is transmitted in response to the device being detected to exist.

In another general aspect, an apparatus configured to receive power, and transceive data, using mutual resonance, includes a power receiver configured to wirelessly receive power from a device, using a power transmission frequency of the device as a resonant frequency. The apparatus further includes a communication unit configured to transceive data to and from the device, using a communication frequency of the device as a resonant frequency, and a controller configured to determine a charging state of a load, and determine the data to be transmitted to the device based on the charging state.

The power receiver may include a first target resonator configured to receive the power from a source resonator of the device that resonates at the power transmission frequency, a rectifier configured to rectify the power, and a converter configured to convert a voltage level of the rectified power to a voltage level to charge the load. The power receiver may further include a charging unit configured to charge the load by adjusting an amount of power with the converted voltage level based on the charging state.

The communication unit may include a second target resonator configured to transmit load-modulated data to a source resonator of the device that resonates at the communication frequency. The communication unit may further include a modulator configured to perform load modulation on data by changing an impedance of the load in response to mutual resonance occurring between the second target resonator and the source resonator.

The second target resonator may be configured to receive a communication signal from the source resonator, and the communication unit may further include a demodulator configured to demodulate data based on a change in a waveform of the communication signal.

The communication unit may be further configured to transmit a charging request of the load to the device in response to the controller being woken up by the power.

The power receiver may include a first target resonator configured to receive the power from a first source resonator of the device that resonates at the power transmission frequency. The communication unit may include a second target resonator configured to transceive the data to and from a second source resonator of the device that resonates at the communication frequency. The first target resonator may include a higher quality factor than a quality factor of the second target resonator. Each of the first target resonator and the second target resonator may include a shape of a loop.

The second target resonator may include the same shape of the loop as the shape of the loop of the first target resonator, may include a same pattern line of the loop as a pattern line of the loop of the first target resonator, and may be located within a predetermined distance from the first target resonator.

The apparatus may further include a filter configured to block the power transmission frequency of the first target resonator, or pass the communication frequency of the second target resonator, to prevent a magnetic field from being induced from the first target resonator to the second target resonator.

In still another general aspect, a method of transmitting power, and transceiving data, using mutual resonance, includes wirelessly transmitting wake-up power from a power transmission resonator to a device, using a power transmission frequency as a resonant frequency. The method further includes transmitting communication power from a communication resonator to the device, using a communication frequency as a resonant frequency, when the wake-up power is transmitted. The method further includes determining a charging state of the device based on a change in an amplitude of the transmitted communication power, and controlling an amount of charging power to be transmitted to the device, using the power transmission frequency based on the charging state.

The determining of the charging state may include determining whether the device exists based on the change in the amplitude of the transmitted communication power. The method may further include wirelessly transmitting the charging power from the power transmission resonator to the device, using the power transmission frequency, in response to the device being determined to exist.

The determining of the charging state may include determining whether charging of the device is completed based on the change in the amplitude of the transmitted communication power. The method may further include interrupting transmission of the charging power to the device, in response to the charging of the device being determined to be completed.

The transmitting of the wake-up power and the transmitting of the communication power may be performed in response to a predetermined period of time elapsing.

In yet another general aspect, a method includes wirelessly transmitting wake-up power to an apparatus, using a power transmission frequency, and wirelessly transmitting communication power to the apparatus, using a communication frequency. The method further includes determining whether data is received from the apparatus, and wirelessly transmitting charging power to the apparatus, using the power transmission frequency, in response to the data being determined to be received.

The method may further include determining whether data indicating that charging of the apparatus is completed, is received from the apparatus. The method may further include interrupting the transmission of the charging power in response to the data indicating that the charging of the apparatus is completed being determined to be received.

Other features and aspects will be apparent from the following detailed description, the drawings, and the claims.

BRIEF DESCRIPTION OF THE DRAWINGS

FIG. 17A is a diagram illustrating an example of a distribution of a magnetic field inside a resonator of a wireless power transmitter produced by feeding a feeder.

Figure 1:
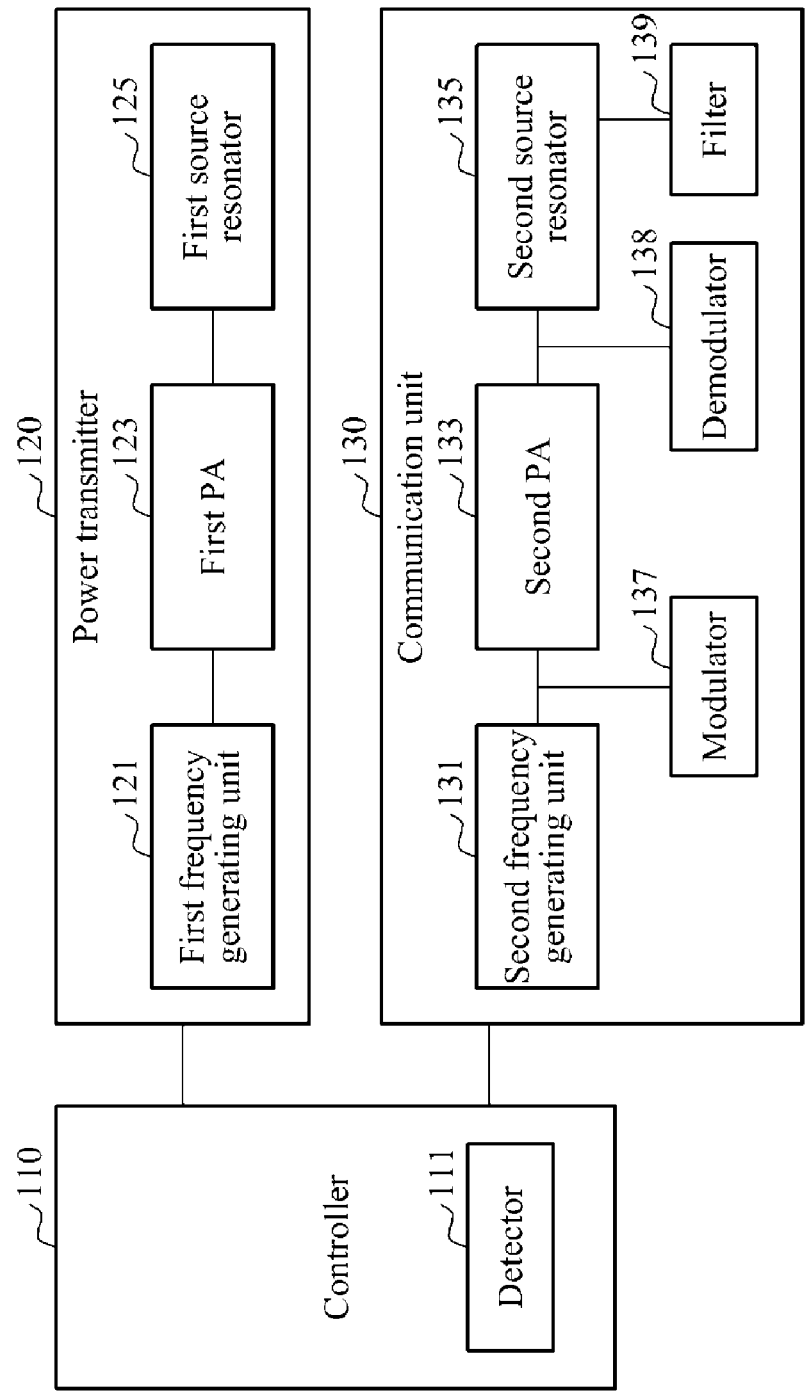
FIG. 1 is a block diagram illustrating an example of an apparatus that transmits power and transceiving data, using mutual resonance.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In a system that transceives power, using a wireless resonance scheme, an apparatus that provides power may be represented as a source device, and an apparatus that receives the provided power may be represented as a target device. Depending on situations, an apparatus operated as a source device may be operated as a target device, and an apparatus operated as a target device may be operated as a source device.

A source device and a target device may provide power and receive provided power, using a resonant frequency of a resonator. Additionally, the source device and the target device may need to exchange control information, during transmission and reception of power. A communication scheme in which the same resonant frequency is used to transceive power and to perform communication may be represented as an in-band communication scheme. A communication scheme in which different resonant frequencies are used to transceive power and to perform communication may be represented as an out-band communication scheme.

In the in-band communication scheme, a structure of a target device may be simplified. However, since a peak of a waveform of a transmission power signal is greatly changed, and a strength of transmitted power is increased, when a source device demodulates data, various problems may occur in the source device and peripheral devices.

In the out-band communication scheme, wireless power transmission and communication may be stably controlled, since wireless power transmission and communication are controlled in independent systems. However, since a radio frequency (RF) communication module of an existing gigahertz (GHz) band is used to control communication, a structure may be complicated, and a separate communication protocol may be needed to be used for control. Additionally, since a communicable distance is longer than a distance enabling power transmission, an unintentional electronic device may be misinterpreted as a target device to be charged.

An apparatus that transmits power and transceives data, using mutual resonance (hereinafter, referred to as a power transmission and data transceiving apparatus or a wireless power transmitter), and an apparatus that receives power and transceives data, using mutual resonance (hereinafter, referred to as a power reception and data transceiving apparatus or a wireless power receiver), may exchange both power and data, using a more simple structure instead of an RF communication module of an existing GHz band, even when the out-band communication scheme is used. In the following description, the power transmission and data transceiving apparatus and the power reception and data transceiving apparatus may be operated as a source device and a target device, respectively.

FIG. 1 illustrates an example of a power transmission and data transceiving apparatus. Referring to FIG. 1, the power transmission and data transceiving apparatus includes a controller 110, a power transmitter 120, and a communication unit 130.

The power transmitter 120 includes a first frequency generating unit 121, a first power amplifier (PA) 123, and a first source resonator 125. The power transmitter 120 wirelessly transmits power through mutual resonance, using a frequency for power transmission (hereinafter, referred to as a power transmission frequency) as a resonant frequency. The power transmitter 120 transmits power to a resonator that mutually resonates with the first source resonator 125. The power transmission frequency may be set to be different from a frequency for communication (hereinafter, referred to as a communication frequency).

The first frequency generating unit 121 generates a power transmission frequency. For example, the first frequency generating unit 121 may generate the power transmission frequency, using a frequency generator that is used in an RF communication field.

The first PA 123 amplifies an amplitude of a signal with a power transmission frequency. The signal with the power transmission frequency may refer to a signal of a power transmission frequency generated by the first frequency generating unit 121. The first PA 123 may determine an amplification amount based on control of the controller 110. The first PA 123 may determine an amplification amount based on an amount of power needed by a device to be charged or a target device.

The first source resonator 125 transmits power corresponding to the amplitude amplified by the first PA 123, through mutual resonance to a target resonator that resonates at a power transmission frequency. FIG. 1 illustrates only the first source resonator 125; however, a plurality of source resonators that resonate at the power transmission frequency may also be used.

The communication unit 130 includes a second frequency generating unit 131, a second PA 133, and a second source resonator 135. The communication unit 130 transceives data through mutual resonance, using a communication frequency as a resonant frequency. The communication frequency may be greater than twice, or less than half, a power transmission frequency. A value of the communication frequency and a value of the power transmission frequency may be set to not affect each other.

The second frequency generating unit 131 generates a communication frequency. For example, the second frequency generating unit 131 may generate a communication frequency, using a frequency generator that is used in an RF communication field.

The second PA 133 amplifies an amplitude of a signal with a communication frequency. The second PA 133 may determine an amplification amount based on influence of a surrounding environment in which a communication signal is transmitted. The surrounding environment may include, for example, an interference amount of another signal, a state of a channel, and/or other information known to one of ordinary skill in the art. The amplification amount may be set in advance, or may be determined by the controller 110.

The second source resonator 135 receives load-modulated data, through mutual resonance, from a target resonator that resonates at a communication frequency. A target device that receives power may perform load modulation by changing an impedance of the target device. Additionally, the second source resonator 135 transmits data modulated by a source device or the power transmission and data transceiving apparatus, through the mutual resonance. FIG. 1 illustrates only the second source resonator 135; however, a plurality of source resonators that resonate at the communication frequency may also be used.

The communication unit 130 further includes a modulator 137, a demodulator 138, and a filter 139. The demodulator 138 may demodulate load-modulated data, based on a variation in an amplitude of a signal with a communication frequency, when mutual resonance occurs. For example, when an impedance is changed in a target device, the amplitude of the signal with the communication frequency may be changed. In this example, the demodulator 138 may demodulate data transmitted by the target device, based on the change in the amplitude. In another example, the demodulator 138 may detect an envelope of the signal with the communication frequency, and may demodulate data based on a variation in the envelope.

The modulator 137 modulates data by changing a waveform of a signal with a communication frequency. The second source resonator 135 transmits the data modulated by the modulator 137 to a target resonator of a target device. The target device may analyze a change in a waveform of a received signal, and may demodulate data transmitted by the source device based on the change in the waveform.

The filter 139 blocks a power transmission frequency of the first source resonator 125, to prevent a magnetic field from being induced from the first source resonator 125 to the second source resonator 135. In this example, the filter 139 is connected to the second source resonator 135, and prevents the power transmission frequency from being induced to the second source resonator 135. In another example, the filter 139 may be connected to the first source resonator 125, and may prevent a communication frequency of the second source resonator 135 from being induced to the first source resonator 125.

The filter 139 passes only a communication frequency of the second source resonator 135, to prevent a magnetic field from being induced from the first source resonator 125 to the second source resonator 135. In this example, the filter 139 is connected to the second source resonator 135, and passes only the communication frequency. In another example, the filter 139 may be connected to the first source resonator 125, and may pass only a power transmission frequency of the first source resonator 125.

The controller 110 verifies a charging state of a target device, using data received from the communication unit 130. For example, the controller 110 may verify the charging state of the target device, based on data demodulated by the demodulator 138. In an example, the charging state may be classified into a state in which charging is required, and a state in which charging is completed. In another example, the charging state may be classified based on which level corresponds to a charging level among levels that are set in advance.

The controller 110 controls an amount of power to be transmitted by the power transmitter 120, based on the charging state of the target device. When the charging state is the state in which charging is required to be started, the controller 110 increases the amount of the power. When the charging state is in the state in which charging is required to continue to be performed, the controller 110 maintains the amount of the power. When the charging state is in the state in which charging is completed, the controller 110 interrupts transmission of the power.

The controller 110 includes a detector 111. The detector 111 detects existence of the target device to be charged, based on whether the communication unit 130 receives data from the target device. Based on the data demodulated by the demodulator 138, the detector 111 may acquire information of the existence of the target device, and identification information of the target device.

The controller 110 controls the amount of the power to be transmitted by the power transmitter 120 so that wake-up power is transmitted, until the target device to be charged is detected. When the target device is detected, the controller 110 controls the amount of power to be transmitted by the power transmitter 120 so that charging power is transmitted. The wake-up power may be used to activate a control module of the target device. The control module of the target device may generate a control signal to control the target device to receive power and to perform communication. The charging power may be used to perform charging of the target device.

The first source resonator 125 may have a higher quality factor than the second source resonator 135. By using different materials to form the first source resonator 125 and the second source resonator 135, a quality factor of the first source resonator 125 may be higher than a quality factor of the second source resonator 135. The first source resonator 125 and the second source resonator 135 may have the same loop shape.

A loop of the second source resonator 135 may be formed with the same pattern line as a pattern line forming a loop of the first source resonator 125. Additionally, the second source resonator 135 may be located within a predetermined distance from the first source resonator 125. The first source resonator 125 and the second source resonator 135 may be formed to adhere closely to each other, and accordingly, may be easily mounted in a small-sized device.

The power transmission and data transceiving apparatus of FIG. 1 may simplify a configuration of a system, and may stably control communication, by resonating at a communication frequency in a near field, unlike an existing out-band communication scheme. A control module of a target device that receives power may receive power supply through power received using a power transmission frequency, and may perform communication, using a communication frequency. Accordingly, load modulation may be performed using low power, compared to an existing in-band communication scheme. The controller 110 may control the first PA 123 to transmit power in a power level needed by the target device, based on a charging state of the target device in data received from the target device.

Figure 2:
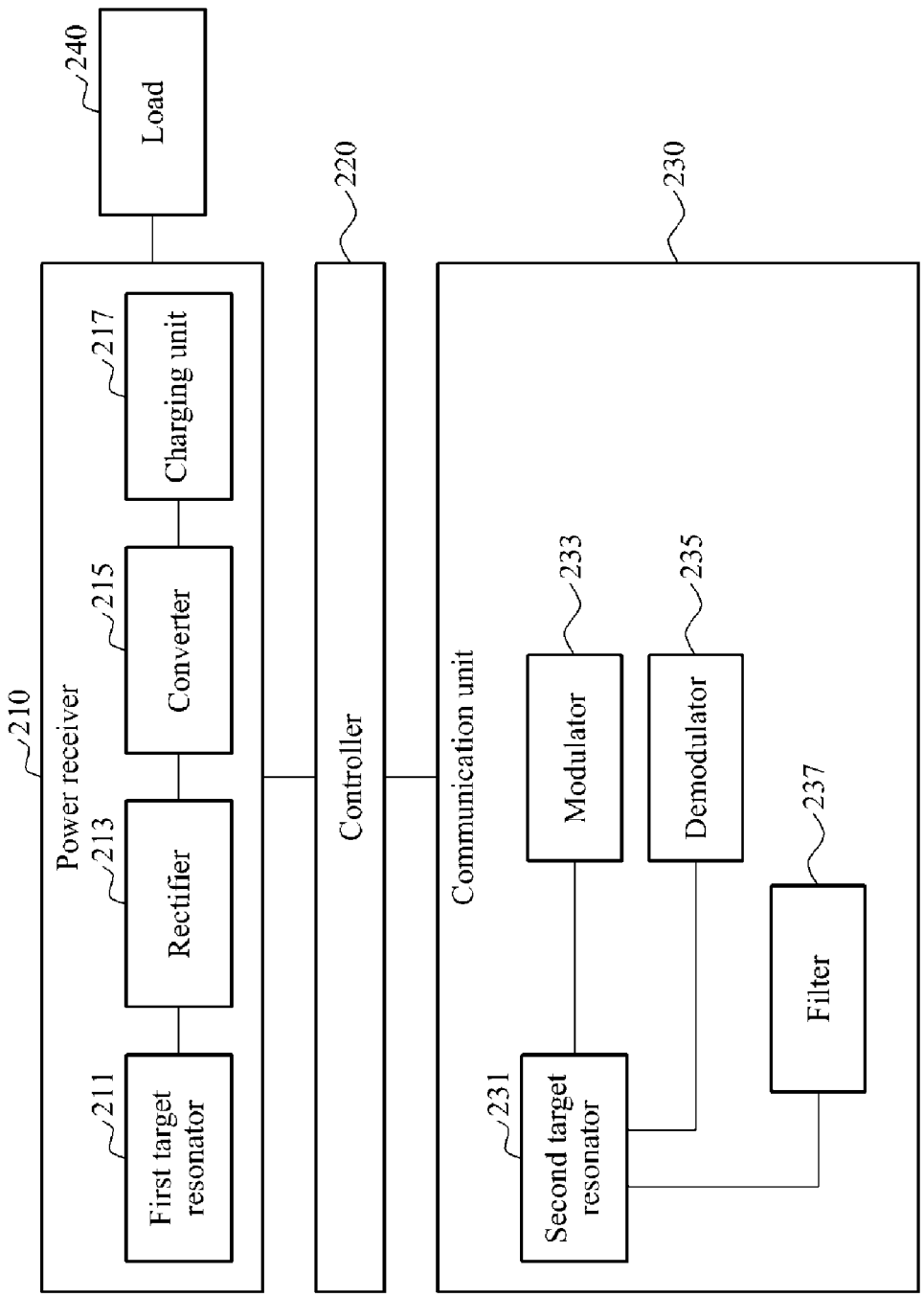
FIG. 2 is a block diagram illustrating an example of an apparatus that receives power and transceiving data, using mutual resonance.

FIG. 2 illustrates an example of a power reception and data transceiving apparatus. Referring to FIG. 2, the power reception and data transceiving apparatus includes a power receiver 210, a controller 220, and a communication unit 230.

The power receiver 210 includes a first target resonator 211, a rectifier 213, a converter 215, and a charging unit 217. The power receiver 210 wirelessly receives power through mutual resonance, using a power transmission frequency of a wireless power transmitter as a resonant frequency.

The first target resonator 211 receives power through mutual resonance from a source resonator that resonates at the power transmission frequency. The first target resonator 211 mutually resonates with the source resonator at the power transmission frequency. FIG. 2 illustrates only the first target resonator 211; however, a plurality of target resonators that resonate at the power transmission frequency may also be used.

The rectifier 213 rectifies power received by the first target resonator 211. For example, alternating current (AC) power may be received through mutual resonance. The rectifier 213 may rectify the AC power to direct current (DC) power.

The converter 215 converts a voltage level of the power rectified by the rectifier 213 to a voltage level needed to charge a load 240. For example, the converter 215 may convert a DC voltage level of the DC power to a charging DC voltage level of the load 240. A rated voltage level of the load 240 may be determined based on a type of the load 240. Accordingly, the converter 215 may convert the voltage level based on the rated voltage level.

The charging unit 217 charges the load 240, by adjusting an amount of power with the voltage level converted by the converter 215 based on a charging state of the load 240. For example, when charging is needed in a constant current (CC) mode or a constant voltage (CV) mode based on the charging state of the load 240, the charging unit 217 may charge the load 240 by adjusting the amount of the power with the converted voltage level to correspond to the CC mode or the CV mode.

The communication unit 230 includes a second target resonator 231, a modulator 233, a demodulator 235, and a filter 237. The communication unit 230 transceives data through mutual resonance, using a communication frequency as a resonant frequency. The power transmission frequency and the communication frequency may be set to have different values. The communication frequency may be greater than twice, or less than half, the power transmission frequency. A value of the communication frequency and a value of the power transmission frequency may be set to not affect each other.

The second target resonator 231 transmits load-modulated data through mutual resonance to a source resonator that resonates at the communication frequency. FIG. 2 illustrates only the second target resonator 231; however, a plurality of target resonators that resonate at the communication frequency may also be used.

The modulator 233 performs load modulation on data, by changing an impedance of the load 240. The modulator 233 may connect the load 240 to an inductor, a capacitor, and/or a resistor, to change an impedance of the power reception and data transceiving apparatus or a target device.

The demodulator 235 demodulates data based on a change in a waveform of a communication signal received from a source resonator by the mutual resonance in the second target resonator 231. For example, the demodulator 235 may detect an envelope of the communication signal, and may demodulate data based on a variation in the envelope.

The filter 237 blocks a resonant frequency of the first target resonator 211, and/or passes only a resonant frequency of the second target resonator 231, to prevent a magnetic field from being induced from the first target resonator 211 to the second target resonator 231. In the example, the filter 237 is connected to the second target resonator 231, and blocks a power transmission frequency of the first target resonator 211. In another example, the filter 237 may be connected to the first target resonator 211, and may block a communication frequency of the second target resonator 231. In still another example, the filter 237 may be connected to the first target resonator 211, and may pass only the power transmission frequency of the first target resonator 211.

The controller 220 verifies a charging state of the load 240, and determines, based on the verified charging state, information that is to be transmitted by the communication unit 230. For example, when the controller 220 is woken up by power received by the power receiver 210, a charging request of the load 240 may be determined to be transmitted by the communication unit 230. The controller 220 may transmit the charging request signal, using the communication unit 230. In another example, when charging of the load 240 is completed, the controller 220 may transmit a charging completion signal through the communication unit 230.

The load 240 may be mounted in the power reception and data transceiving apparatus, or may be connected via a connection terminal to an external apparatus of the power reception and data transceiving apparatus.

The first target resonator 211 may have a higher quality factor than the second target resonator 231. By using different materials to form the first target resonator 211 and the second target resonator 231, a quality factor of the first target resonator 211 may be higher than a quality factor of the second target resonator 231. Each of the first target resonator 211 and the second target resonator 231 may have a shape of a loop.

The second target resonator 231 may have the same shape of the loop as the first target resonator 211, and may be formed with the same pattern line as a pattern line forming the loop of the first target resonator 211. Additionally, the second target resonator 231 may be located within a predetermined distance from the first target resonator 211. The first target resonator 211 and the second target resonator 231 may be formed to adhere closely to each other, and accordingly, may be easily mounted in a small-sized device.

Figure 3:
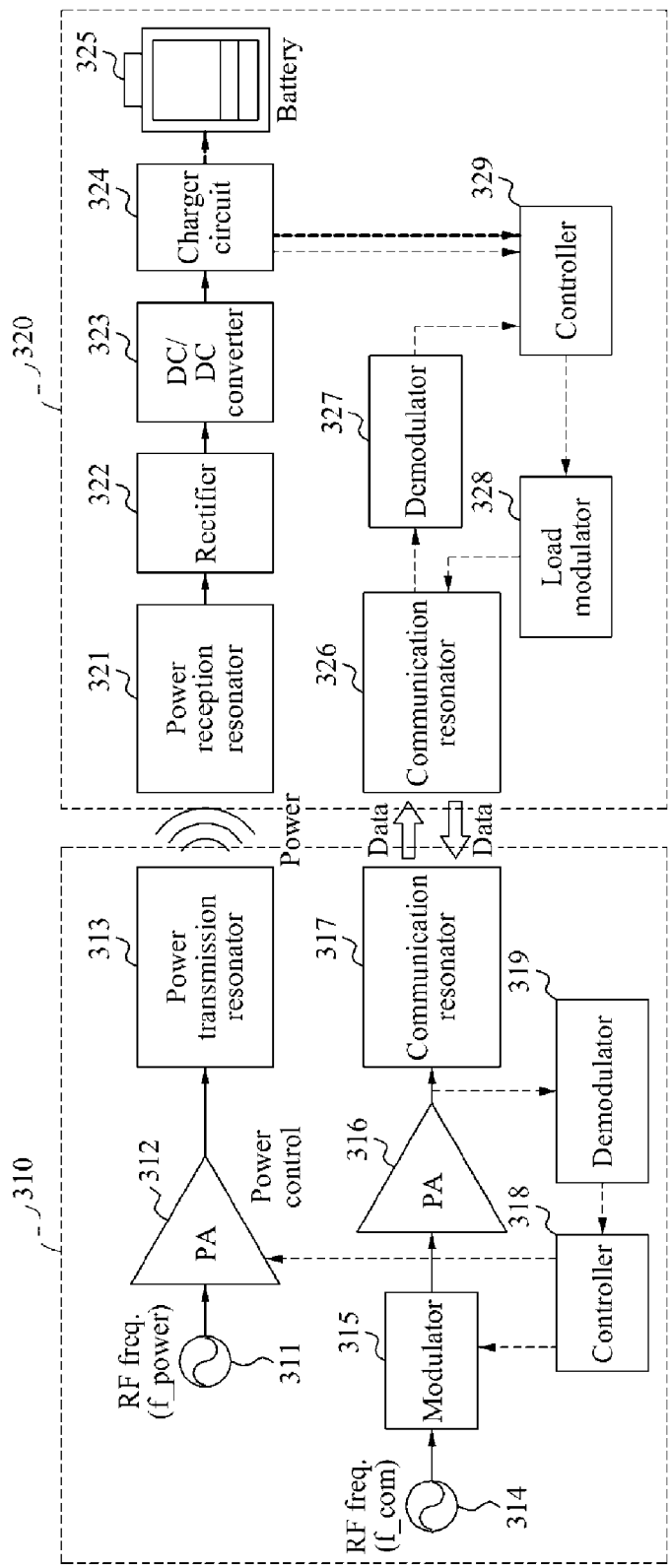
FIG. 3 is a block diagram illustrating an example of a system that transceives power and data, using mutual resonance.

FIG. 3 illustrates an example of a system that transceives power and data, using mutual resonance. Referring to FIG. 3, the system includes a source device 310 and a target device 320.

The source device 310 wirelessly supplies power to the target device 320, and transmits data to the target device 320. Additionally, the source device 310 receives data from the target device 320.

The source device 310 transmits power to the target device 320 by resonating with the target device 320, using a power transmission frequency as a resonant frequency. Additionally, the source device 310 transceives data to and from the target device 320 by resonating with the target device 320, using a communication frequency as the resonant frequency.

The source device 310 generates a power transmission frequency (f_power), using a frequency generator 311. The power transmission frequency is input to a PA 312. Based on control of a controller 318, the PA 312 amplifies a signal of the power transmission frequency input to the PA 312. The controller 318 determines an amplification amount of the PA 312, based on data demodulated by a demodulator 319. The demodulator 319 demodulates data that is load-modulated and that is received by a communication resonator 317, based on a change in a waveform of a signal applied to the communication resonator 317. The amplified signal of the power transmission frequency is transferred from a power transmission resonator 313 to a power reception resonator 321. The power transmission resonator 313 and the power reception resonator 321 mutually resonate using the power transmission frequency as a resonant frequency.

A frequency generator 314 generates a communication frequency (f_com). The communication frequency is input to a modulator 315. The modulator 315 modulates a phase, an amplitude, and/or other parameters known to one of ordinary skill in the art, of a signal of the communication frequency. The modulator 315 modulates data, based on the control of the controller 318. A PA 316 amplifies the modulated amplitude of the signal of the communication frequency. An amplification amount may be determined so that the modulated data is transmitted from the communication resonator 317 to a communication resonator 326 without an error. The communication resonators 317 and 326 mutually resonate using the communication frequency as a resonant frequency.

The power transmission frequency and the communication frequency may be set to have different values. The communication frequency may be greater than twice, or less than half, the power transmission frequency.

The target device 320 rectifies, using a rectifier 322, power received by the power reception resonator 321. A DC-to-DC (DC/DC) converter 323 converts a voltage of the rectified power to a rated voltage of a battery 325. A charger circuit 324 controls the voltage converted by the DC/DC converter 323 to be transferred adaptively to the battery 325 based on a charging state of the battery 325. For example, the charger circuit 324 may control power to be transferred to the battery 325 in a CC mode or CV mode.

The voltage converted by the DC/DC converter 323 is transferred to a controller 329, to wake up the controller 329. Power received via the power reception resonator 321 is transferred to the controller 329, and is used to wake up the controller 329. Based on control of the controller 329, a load modulator 328 modulates data. The load modulator 328 changes an impedance of the target device 320, to modulate the data. In more detail, when the load modulator 328 changes the impedance of the target device 320, a waveform of a signal applied to the communication resonator 317 that mutually resonates with the communication resonator 326 is changed. In this example, a shape and/or an amplitude of the waveform may be changed. A demodulator 327 demodulates data based on a change in a waveform of a signal applied to the communication resonator 326. The demodulated data may be transferred to the controller 329.

The target device 320 transceives a communication signal, using a communication module that includes the communication resonator 326, the demodulator 327, the load modulator 328 and the controller 329. In other words, the target device 320 may include a simple configuration, compared to an RF communication module of a typical GHz band, and may not require a separate communication protocol. Thus, the communication module may be simply controlled.

Figure 4:
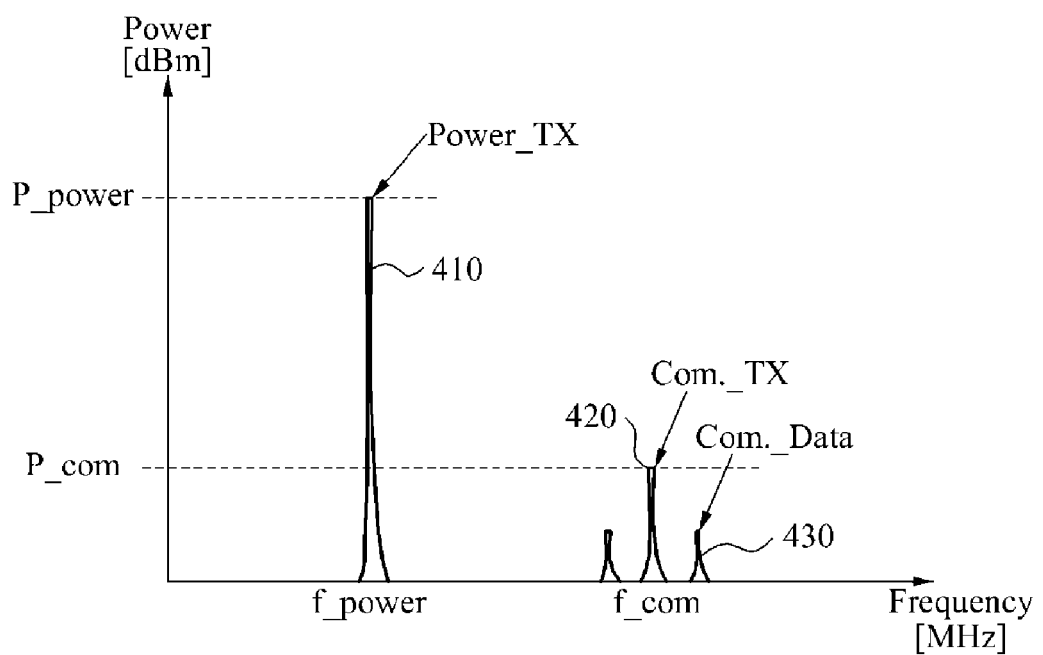
FIG. 4 is a graph illustrating an example of a frequency domain representation of a power transmission frequency and a communication frequency that are used in a system that transceives power and data, using mutual resonance.

FIG. 4 illustrates an example of a frequency domain representation of a power transmission frequency and a communication frequency that are used in a system that transceives power and data, using mutual resonance. Referring to FIG. 4, an amplitude P_power or Power_TX of a power transmission frequency f_power 410 is greater than an amplitude P_com or Com._TX of a communication frequency f_com 420 and an amplitude Com._Data of a communication frequency f_com 430. The communication frequency f_com 430 indicates modulated data. Data may be demodulated based on the communication frequency f_com 430. For example, a source device may demodulate data that is load-modulated by a target device based on the communication frequency f_com 430. In this example, the target device may demodulate data modulated by the source device based on the communication frequency f_com 430.

The power transmission frequency f_power 410 may be used to transmit a power level of transmission power P_power in a clean sine wave. The communication frequency f_com 420 or 430 may be used to perform data communication in a power level of transmission power P_com or Com._Data, and accordingly, data may be stably transmitted and received, regardless of the power level of the transmission power P_power.

Figure 5:
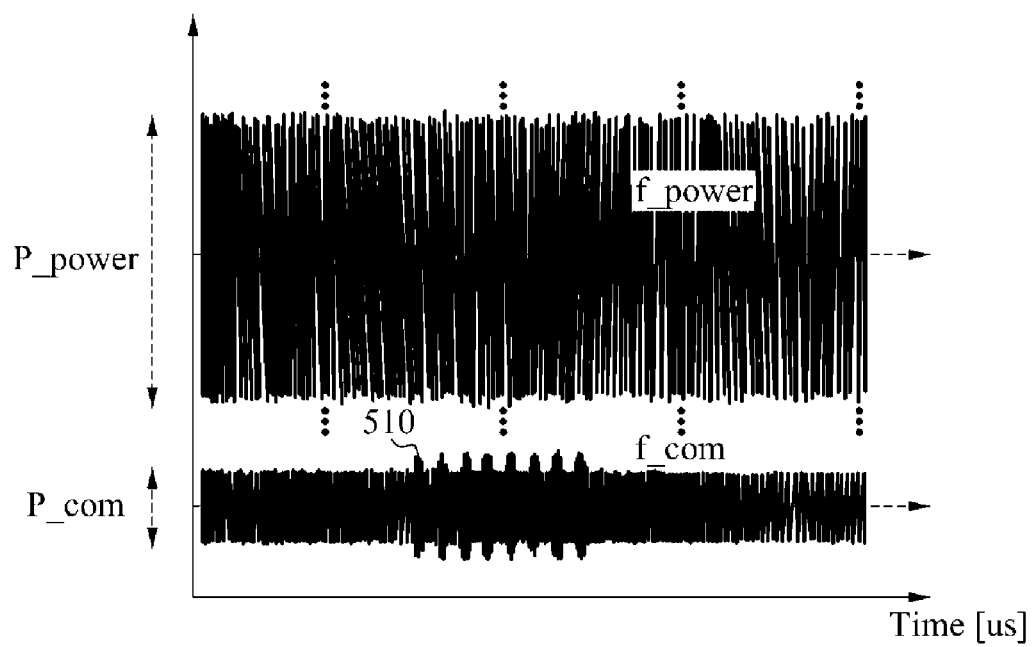
FIG. 5 is a graph illustrating an example of a time domain representation of a power transmission frequency and a communication frequency that are used in a system that transceives power and data, using mutual resonance.

FIG. 5 illustrates an example of a time domain representation of a power transmission frequency and a communication frequency that are used in a system that transceives power and data, using mutual resonance. Referring to FIG. 5, a larger amount of transmission power P_power than an amount of communication power P_com is transmitted using a power transmission frequency f_power from a source device to a target device. Peak values 510 that vary in the communication power P_com transmitting using a communication frequency f_com indicate data modulated by load modulation. Based on the peak values 510, modulated data may be demodulated. For example, modulated data may be demodulated based on an amplitude of the peak values 510, a time difference between the peak values 510, and/or other parameters known to one of ordinary skill in the art.

Figure 6:
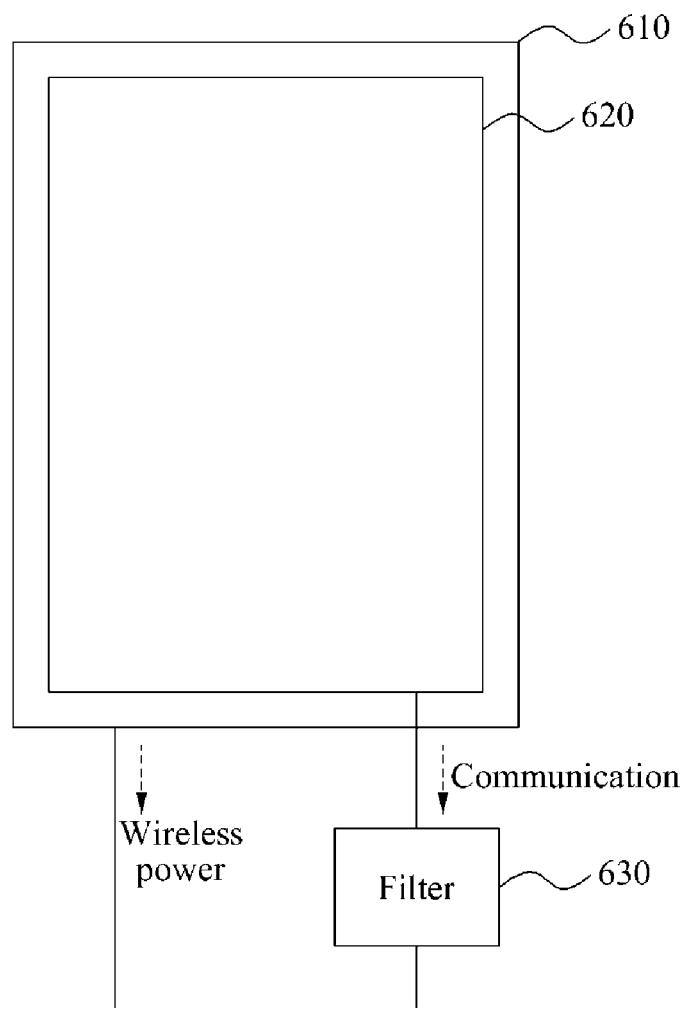
FIGS. 6 through 8 are diagrams illustrating examples of dual resonators, each including a power transmission resonator and a communication resonator that are used in a system that transceives power and data, using mutual resonance.
Figure 7:
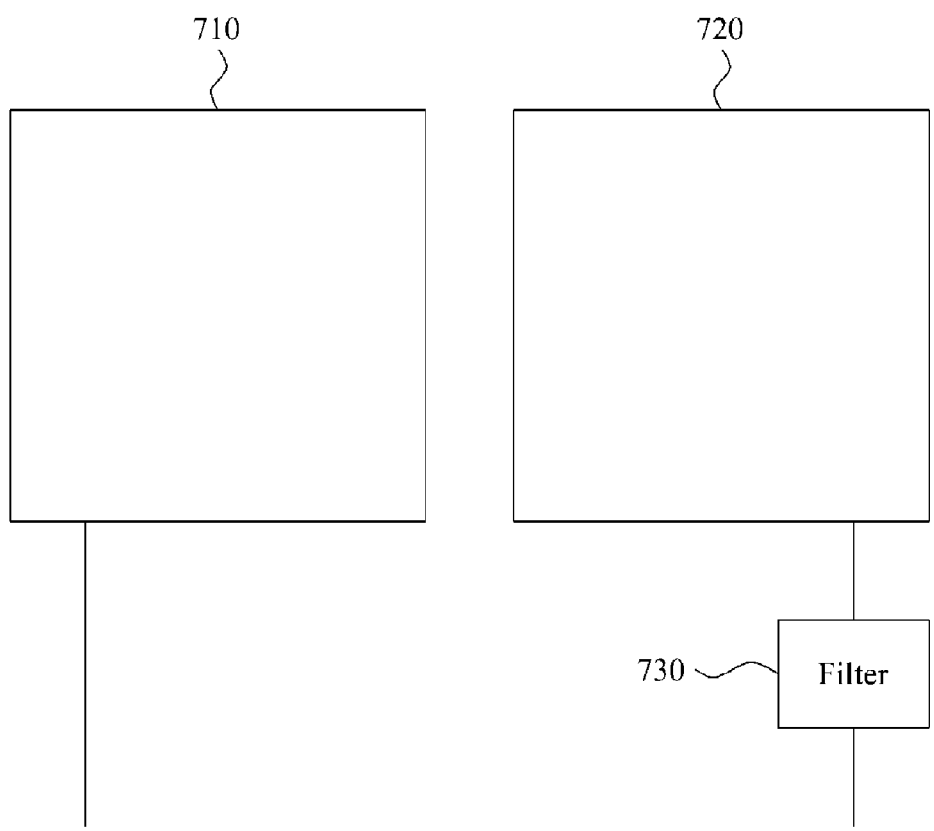
Figure 8:
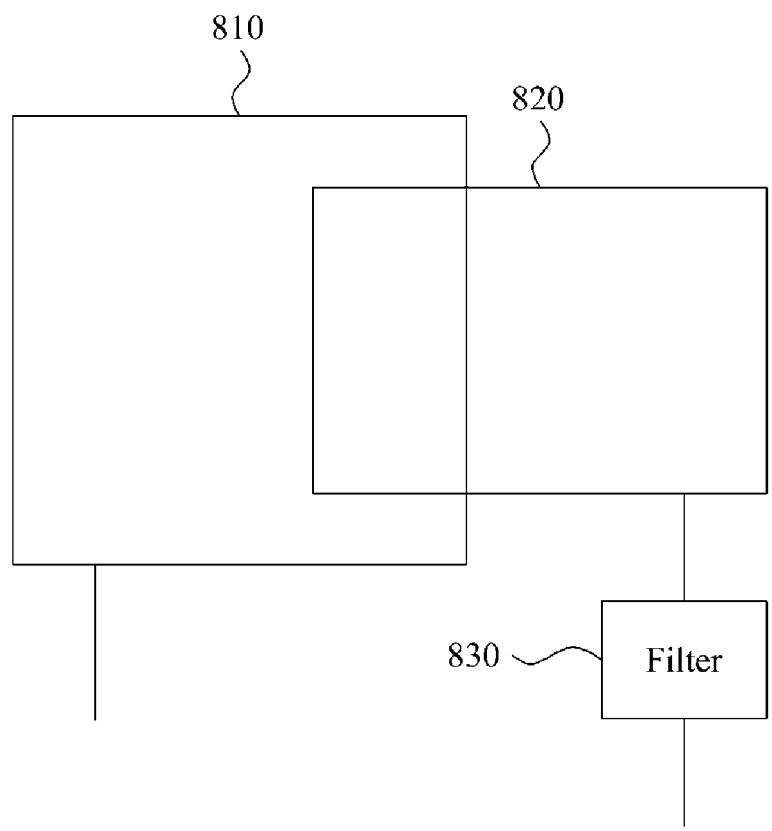

FIGS. 6 through 8 illustrate examples of dual resonators. Each of the dual resonators includes a power transmission resonator and a communication resonator that are used in a system that transceives power and data, using mutual resonance.

FIG. 6 illustrates an example of a structure of a dual resonator with a high isolation effect. The high isolation effect may indicate minimizing an effect of a magnetic field formed in a power transmission resonator 610 on a communication resonator 620, and minimizing an effect of a magnetic field formed in the communication resonator 620 on the power transmission resonator 610.

Referring to FIG. 6, the power transmission resonator 610 may be designed to have a higher quality factor than the communication resonator 620. The power transmission resonator 610 and the communication resonator 620 may be configured along the same pattern line. Accordingly, the power transmission resonator 610 and the communication resonator 620 may occupy a small area in a source device or a target device, even when both the power transmission resonator 610 and the communication resonator 620 are used.

A filter 630 is connected to the communication resonator 620, to prevent power (wireless power) from flowing from the power transmission resonator 610 to the communication resonator 620. In an example, the filter 630 may be a notch filter configured to block a power transmission frequency f_power. In another example, the filter 630 may be a band pass filter configured to pass only a communication frequency f_com. In still another example, when the communication frequency f_com is designed to be less than the power transmission frequency f_power, the filter 630 may be a low pass filter configured to pass only the communication frequency f_com. The filter 630 is connected to the communication resonator 620 as illustrated in FIG. 6; however, the filter 630 may be connected to the power transmission resonator 610.

The communication resonator 620 performs communication, independently of the power transmission resonator 610, and may have a lower quality factor than the power transmission resonator 610. Accordingly, the communication resonator 620 may have a high data transmission rate. An occupied bandwidth may be widened to increase a data transmission rate, because a resonator with a low quality factor may provide a wide bandwidth.

Referring to FIG. 7, a power transmission resonator 710 and a communication resonator 720 are separated from each other, and are configured in symmetrical pattern lines. A filter 730 is connected to the communication resonator 720, to block a power transmission frequency or to pass only a communication frequency. The filter 730 may include, for example, a notch filter, a band pass filter, a low pass filter, and/or a high pass filter.

Referring to FIG. 8, a power transmission resonator 810 and a communication resonator 820 are configured in an overlay pattern line in which a portion of the power transmission resonator 810 and a portion of the communication resonator 820 overlap each other. A filter 830 is connected to the communication resonator 820, to block a power transmission frequency or to pass only a communication frequency. The filter 830 may include, for example, a notch filter, a band pass filter, a low pass filter, and/or a high pass filter.

Figure 9:
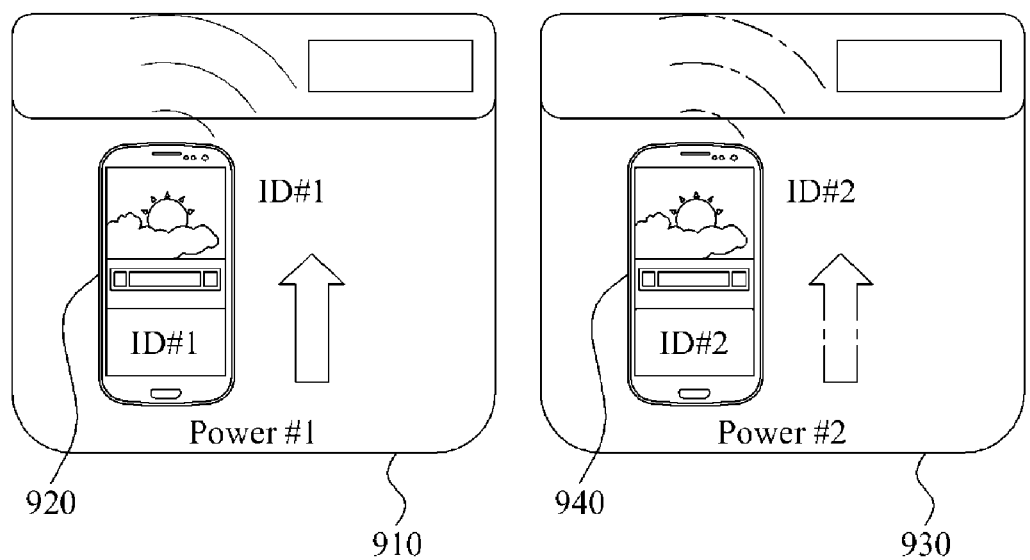
FIG. 9 is a diagram illustrating an example of a distance enabling recognition of a target device through communication in an apparatus that transmits power and transceiving data, using mutual resonance.

FIG. 9 illustrates an example of a distance enabling recognition of a target device through communication in a power transmission and data transceiving apparatus. Referring to FIG. 9, a source device 910 transmits power Power #1 to a target device 920, using a power transmission frequency as a resonant frequency. The source device 910 acquires an identifier ID #1 of the target device 920, using a communication frequency as a resonant frequency. A distance recognizable by a resonance scheme using the communication frequency may be similar to or longer than a distance enabling power to be transmitted using the power transmission frequency as the resonant frequency. Accordingly, the source device 910 may not recognize an identifier ID #2 of a target device 940 that is at a distance. A distance enabling recognition of a target device may be adjusted by controlling the communication frequency. Since the distance enabling recognition of the target device is shorter than an example in which a typical RF communication module is used, it is possible to prevent a target device from being unnecessarily recognized by a source device.

A source device 930 recognizes the identifier ID #2 of the target device 940, using the communication frequency as a resonant frequency, and transmits power to the target device 940, using the power transmission frequency as a resonant frequency. The source devices 910 and 930 may not receive identification information of another target device that wirelessly receives power in a vicinity of the source devices 910 and 930.

Figure 10:
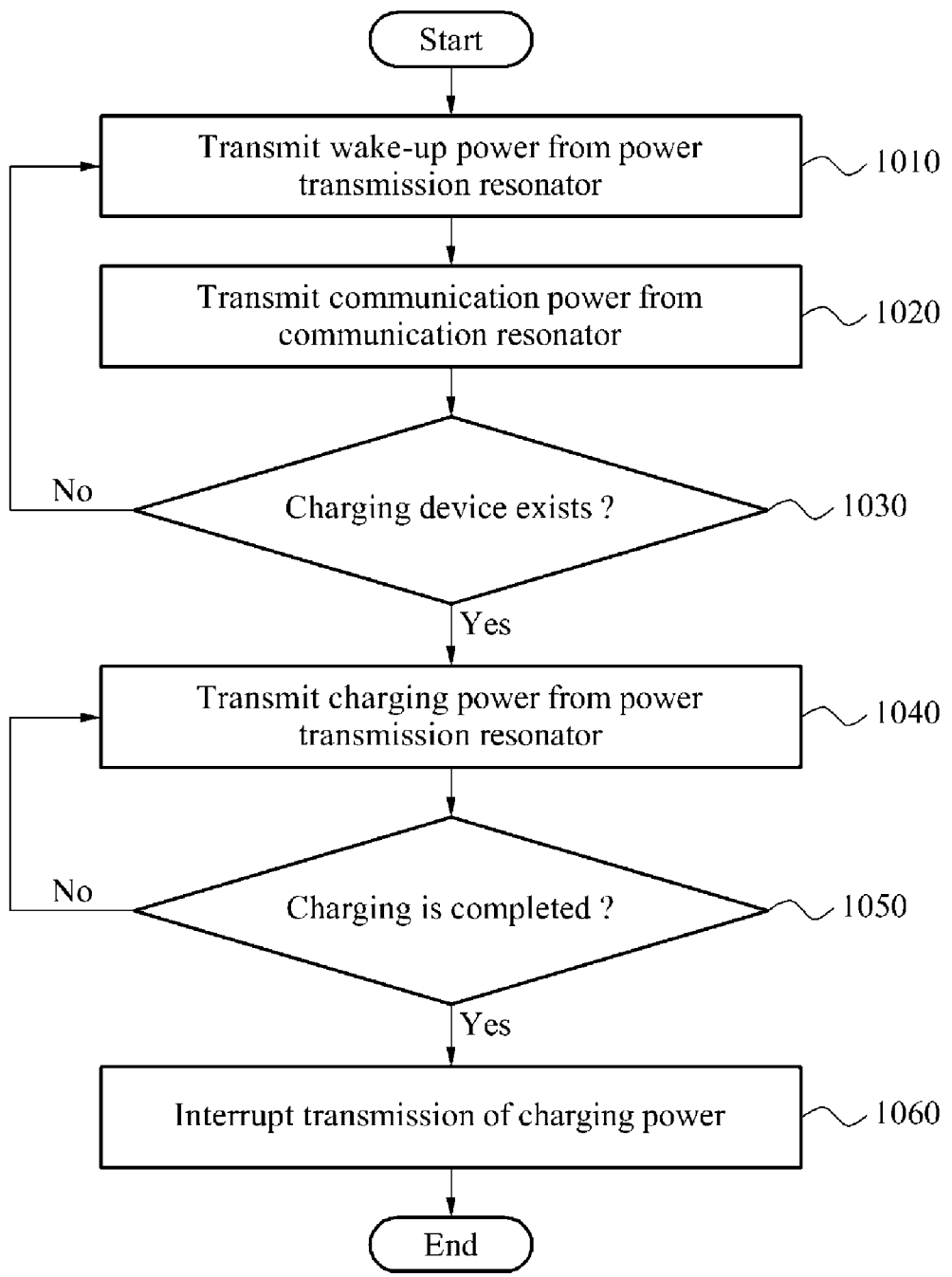
FIG. 10 is a flowchart illustrating an example of a method of transmitting power and transceiving data, using mutual resonance.

FIG. 10 illustrates an example of a method of transmitting power and transceiving data, using mutual resonance. Referring to FIG. 10, in operation 1010, a source device wirelessly transmits wake-up power from a power transmission resonator through mutual resonance to a target device, using a power transmission frequency as a resonant frequency. For example, the wake-up power may wake up a control module of the target device.

In operation 1020, the source device transmits communication power from a communication resonator through mutual resonance to the target device, using a communication frequency as a resonant frequency, when the wake-up power is transmitted.

In operation 1030, the source device determines whether a charging device (e.g., a target device) exists based on a change in an amplitude of the communication power. For example, the source device may verify a charging state of the target device (e.g., a load) based on data of the charging state that is received from the target device. In this example, when a control module of the target device is woken up, the target device may perform load modulation on the data of the charging state of the load, and may transmit the load-modulated data to the source device. The source device may demodulate the load-modulated data based on the change in the amplitude of the transmitted communication power. When the source device determines that the charging device exists, the method continues in operation 1040. Otherwise, the method returns to operation 1010.

In operation 1040, the source device transmits charging power from the power transmission resonator through mutual resonance to the target device, using the power transmission frequency.

In operation 1050, the source device continues to receive the data of the charging state from the target device, and determines whether charging of the target device is completed based on the received data. When the source device determines that the charging of the target device is completed, the method continues in operation 1060. Otherwise, the method returns to operation 1040.

In operation 1060, the source device interrupts transmission of the charging power to the target device.

In an example in which a predetermined period of time elapses, the source device may transmit wake-up power through mutual resonance to the target device, using a power transmission frequency as a resonant frequency, and may transmit communication power through the mutual resonance to the target device, using a communication frequency as a resonant frequency. In another example in which information of a charging request is received from the target device by the communication resonator, using the communication frequency as the resonant frequency, the source device may transmit the charging power from the power transmission resonator through mutual resonance to the target device, using the power transmission frequency as the resonant frequency.

Figure 11A:
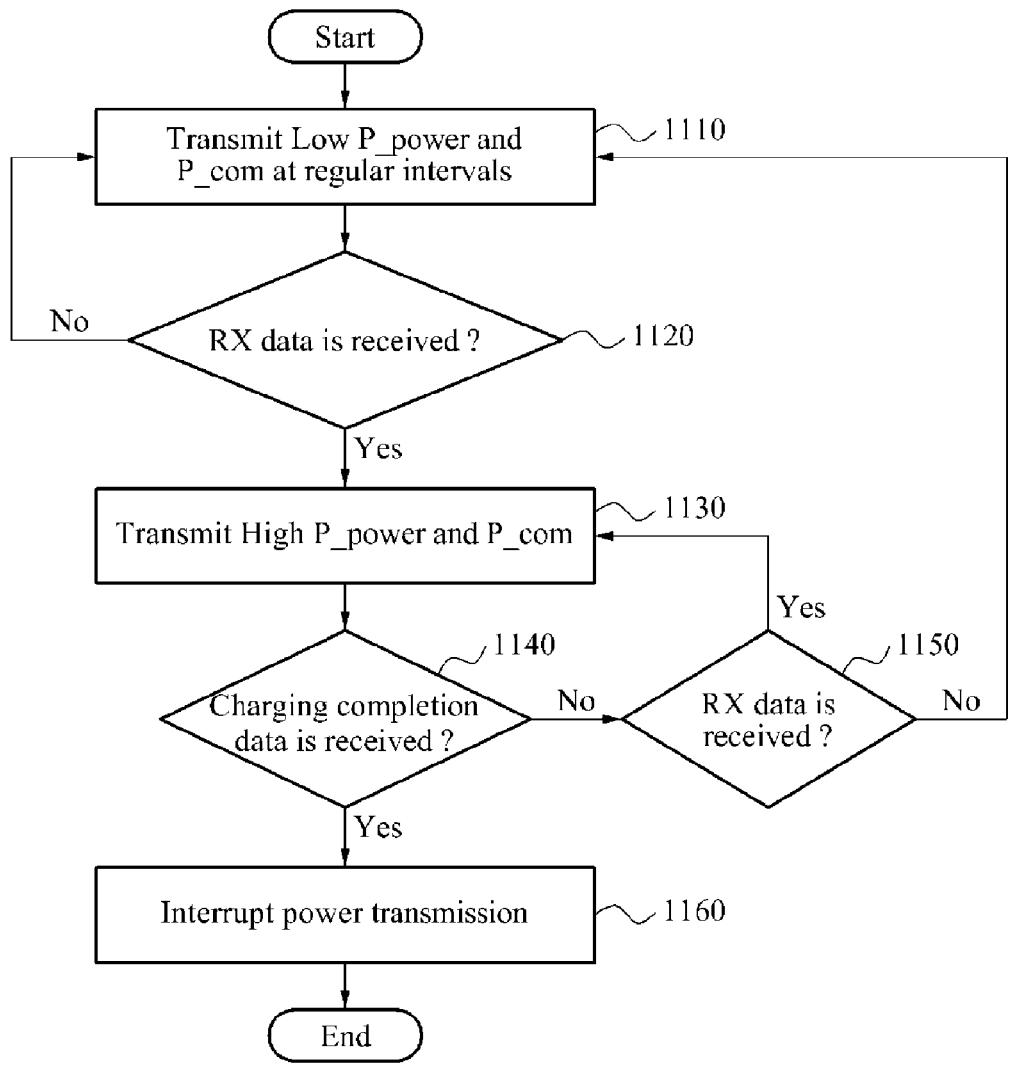
FIG. 11A is a flowchart illustrating another example of a method of transmitting power and transceiving data, using mutual resonance.

FIG. 11A illustrates another example of a method of transmitting power and transceiving data, using mutual resonance. Referring to FIG. 11A, in operation 1110, a source device transmits low power Low P_power at regular intervals through a power transmission resonator to a target device, using a power transmission frequency as a resonant frequency, and transmits constant power P_com at the regular intervals through a communication resonator to the target device, using a communication frequency as a resonant frequency. The low power Low P_power may refer to wake-up power, and may correspond to a minimum amount of power needed to operate a control module of the target device. The constant power P_com may refer to communication power needed to perform communication between the target device and the source device.

In operation 1120, the source device determines whether reception (RX) data is received from the target device through the communication resonator. For example, when the target device is woken up by the low power Low P_power, the target device may transmit, to the source device, identification information of the target device and information of a charging state of the target device. The RX data may refer to the identification information of the target device and the information of the charging state of the target device. When the source device determines that the RX data is received, the method continues in operation 1130. Otherwise, the method returns to operation 1110. That is, when the source determines that the RX data is not received, the source device repeatedly performs operation 1110.

In operation 1130, the source device transmits high power High P_power through the power transmission resonator to the target device, using the power transmission frequency as the resonant frequency, and transmits the constant power P_com through the communication resonator to the target device, using the communication frequency as the resonant frequency. The high power High P_power may refer to charging power used to charge the target device.

In operation 1140, the source device determines whether charging completion data is received from the target device. The charging completion data indicates that charging of the target device is complete. When the source device determines that the charging completion data is not received, the method continues in operation 1150. Otherwise, the method continues in operation 1160.

In operation 1150, the source device determines whether the RX data is received within a predetermined period of time. When the source device determines that the RX data is received within the predetermined period of time, the method returns to operation 1130. That is, the source device re-performs operations 1130 and 1140. When the source device determines that the RX data is not received within the predetermined period of time, the method returns to operation 1110. That is, the source device determines that the target device is separated from the source device by more than a distance recognizable by the source device, and re-performs operation 1110.

In operation 1160, the source device interrupts power transmission to the target device.

Figure 11B:
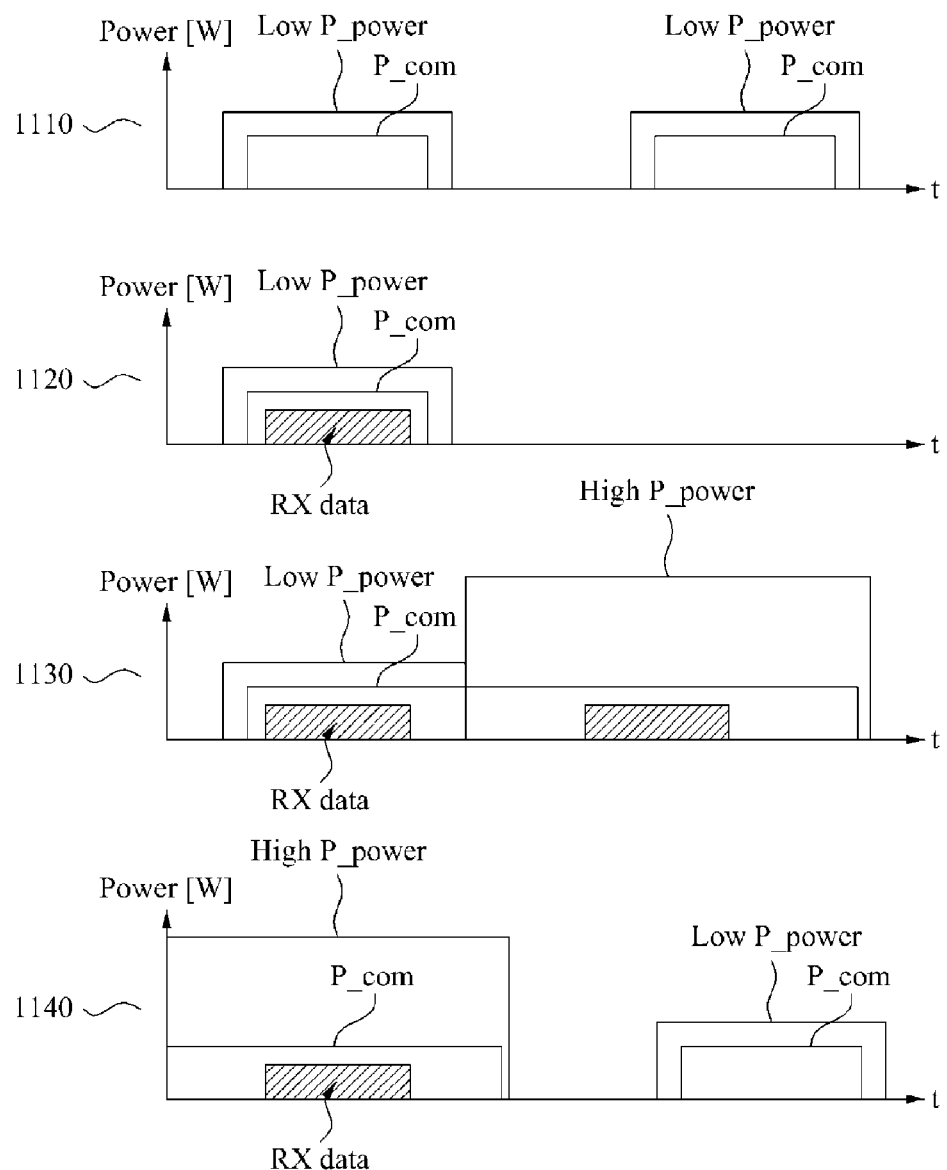
FIG. 11B is a diagram illustrating an example of an amount of power measured in an apparatus that transmits power and transceives data, using mutual resonance, for each of operations of the method of FIG. 11A.

FIG. 11B illustrates an example of an amount of power measured in a power transmission and data transceiving apparatus, for each of operations of the method of FIG. 11A. In this example, the power transmission and data transceiving apparatus operates as a source device.

Referring to FIG. 11B, in operation 1110, when power is supplied to the source device to start an operation of the source device, the source device transmits, to a target device, low power Low P_power and constant power P_com at regular intervals. The low power Low P_power may correspond to a power level to wake up a control module of the target device, and the constant power P_com may be used for communication between the source device and the target device. When the source device determines that the RX data is not received from the target device, the source device may recognize that the target device is not located in a charging area, and may continue to transmit, to the target device, the low power Low P_power and the constant power P_com at regular intervals.

In operation 1120, the source device determines that the RX data is received from the target device based on a change in an amount of the communication power or the constant power P_com.

In operation 1130, the source device increases the low power Low P_power to a high power High P_power based on an amount of power needed by the target device.

In operation 1140 (and operations 1150 and 1130 of FIG. 11A), when the source device determines that charging completion data is not received from the target device, and that the RX data is continuously received from the target device, the source device maintains the high power High P_power. In operation 1140 (and operations 1150 and 1110 of FIG. 11A), when the source device determines that charging completion data is not received from the target device, and that the RX data is not received from the target device, the source device recognizes that the target device is not located in a charging area, interrupts transmission of the high power High P_power, and re-transmits the low power Low P_power. In operation 1140 (and operation 1160 of FIG. 11A), when the source device determines that the charging completion data is received from the target device, the source device interrupts transmission of the high power High P_power to terminate a charging operation.

The examples of a system that transceives power and data, using mutual resonance, may simplify a configuration of a target device, and stably control communication regardless of a power level, by using a communication scheme using a power transmission resonator and a communication resonator that resonate at different frequencies. Additionally, a communication recognition distance may be designed to be similar to a distance enabling charging, using a power transmission frequency and a communication frequency, and thus, it is possible to prevent malfunction of the system. Furthermore, it is possible to provide a structure of a dual resonator for high isolation and including a filter. Moreover, it is possible to provide a structure of a dual resonator with the same pattern line and that minimizes space occupied by resonators. Additionally, it is possible to provide a method that transceives power and data between a source device and a target device, using the power transmission frequency and the communication frequency.

FIGS. 12A, 12B, 13A, 13B, 14A, and 14B illustrate examples of applications using a wireless power receiver and a wireless power transmitter.

Figure 12A:
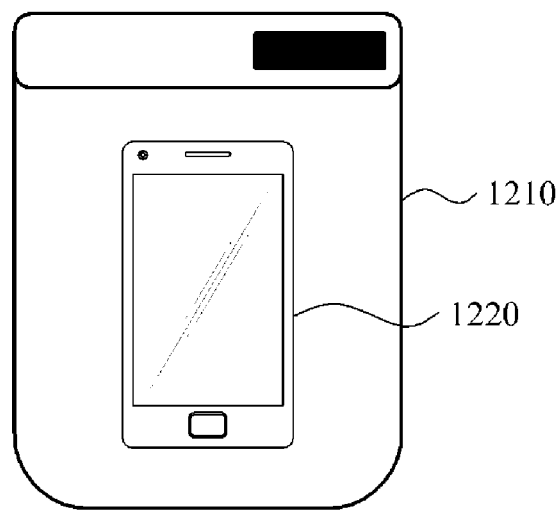
FIGS. 12A through 14B are diagrams illustrating examples of applications using a wireless power receiver and a wireless power transmitter.
Figure 12B:
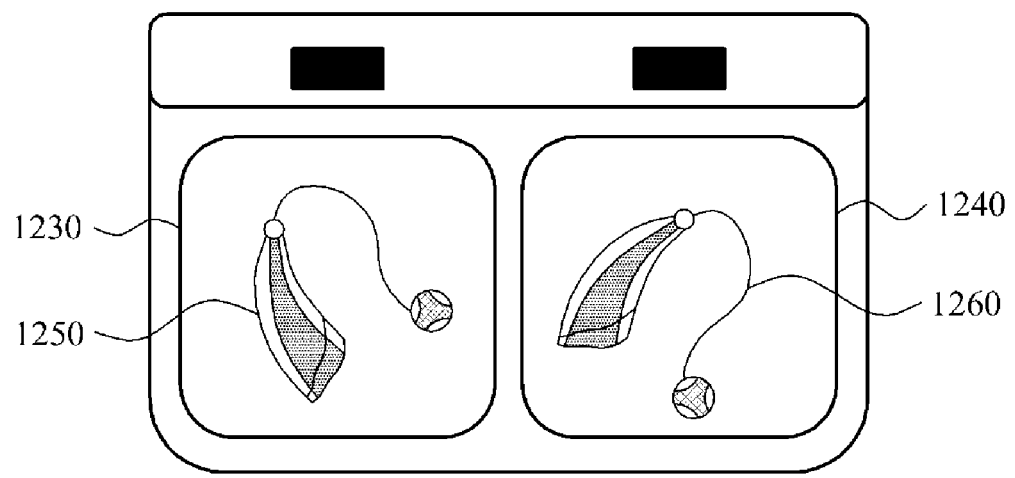

FIG. 12A illustrates an example of wireless power charging between a pad 1210 and a mobile terminal 1220, and FIG. 12B illustrates an example of wireless power charging between pads 1230 and 1240 and hearing aids 1250 and 1260.

In the example in FIG. 12A, a wireless power transmitter is mounted in the pad 1210, and a wireless power receiver is mounted in the mobile terminal 1220. The pad 1210 is used to charge a single mobile terminal, namely, the mobile terminal 1220.

In the example in FIG. 12B, two wireless power transmitters are respectively mounted in the first pad 1230 and the second pad 1240. The hearing aids 1250 and 1260 may be used for a left ear and a right ear, respectively. In this example, two wireless power receivers are respectively mounted in the hearing aids 1250 and 1260.

Figure 13A:
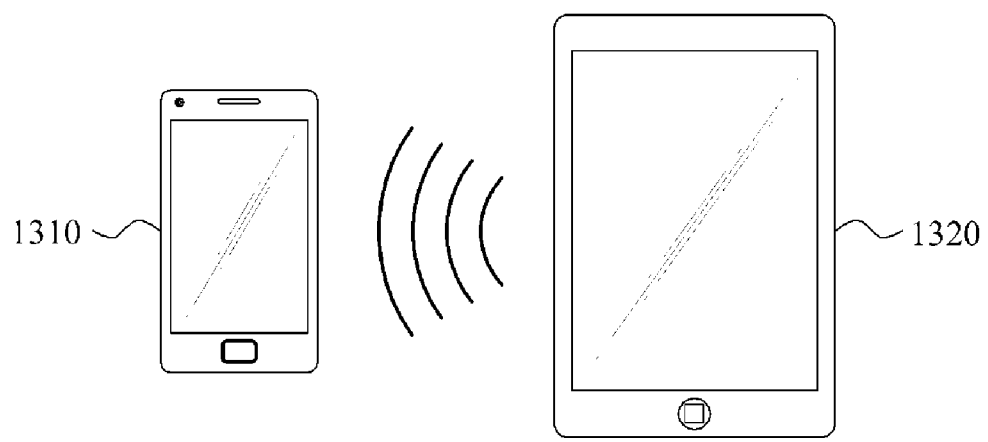
Figure 13B:
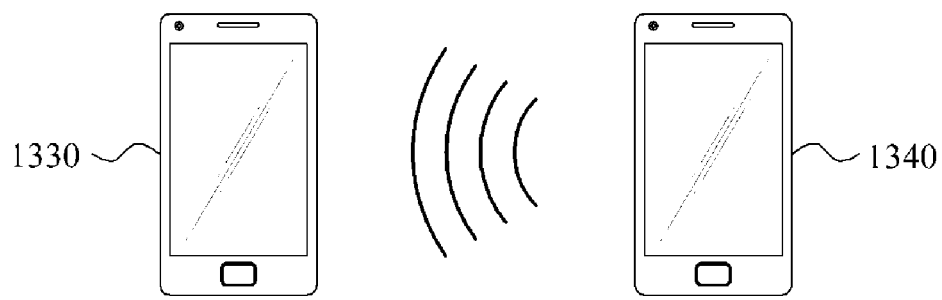

FIG. 13A illustrates an example of wireless power charging between a mobile terminal 1310 and a tablet personal computer (PC) 1320, and FIG. 13B illustrates an example of wireless power charging between mobile terminals 1330 and 1340.

In the example of FIG. 13A, a wireless power transmitter and a wireless power receiver are mounted in the mobile terminal 1310. In this example, a wireless power transmitter and a wireless power receiver are mounted in the tablet PC 1320. The mobile terminal 1310 and the tablet PC 1320 wirelessly exchange power.

In the example of FIG. 13B, a wireless power transmitter and a wireless power receiver are mounted in the mobile terminal 1330. In this example, a wireless power transmitter and a wireless power receiver are mounted in the mobile terminal 1340. The mobile terminals 1330 and 1340 wirelessly exchange power.

Figure 14A:
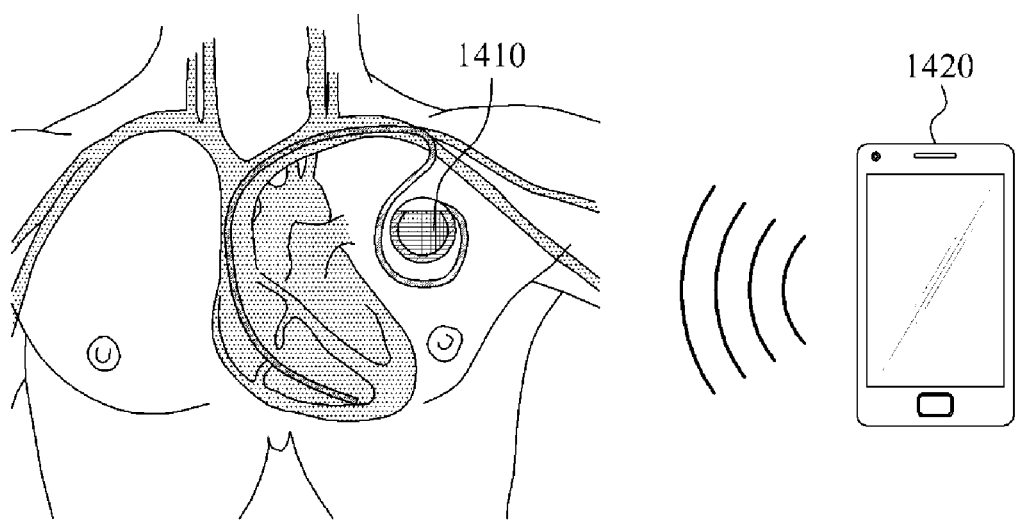
Figure 14B:
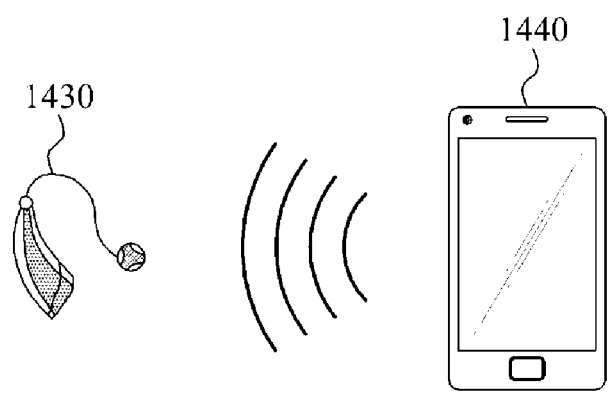

FIG. 14A illustrates an example of wireless power charging between an electronic device 1410 that is inserted into a human body and a mobile terminal 1420. FIG. 14B illustrates an example of wireless power charging between a hearing aid 1430 and a mobile terminal 1440.

In the example in FIG. 14A, a wireless power transmitter and a wireless power receiver are mounted in the mobile terminal 1420, and a wireless power receiver is mounted in the electronic device 1410 inserted in the body. The electronic device 1410 inserted in the body is charged by receiving power from the mobile terminal 1420.

In the example in FIG. 14B, a wireless power transmitter and a wireless power receiver are mounted in the mobile terminal 1440, and a wireless power receiver is mounted in the hearing aid 1430. The hearing aid 1430 is charged by receiving power from the mobile terminal 1440. Low-power electronic devices, such as, for example, Bluetooth earphones, may also be charged by receiving power from the mobile terminal 1440.

In the following description of FIGS. 15A, 15B, 16A, 16B, 17A, and 17B, unless otherwise indicated, the term "resonator" may refer to both a source resonator and a target resonator.

Figure 15A:
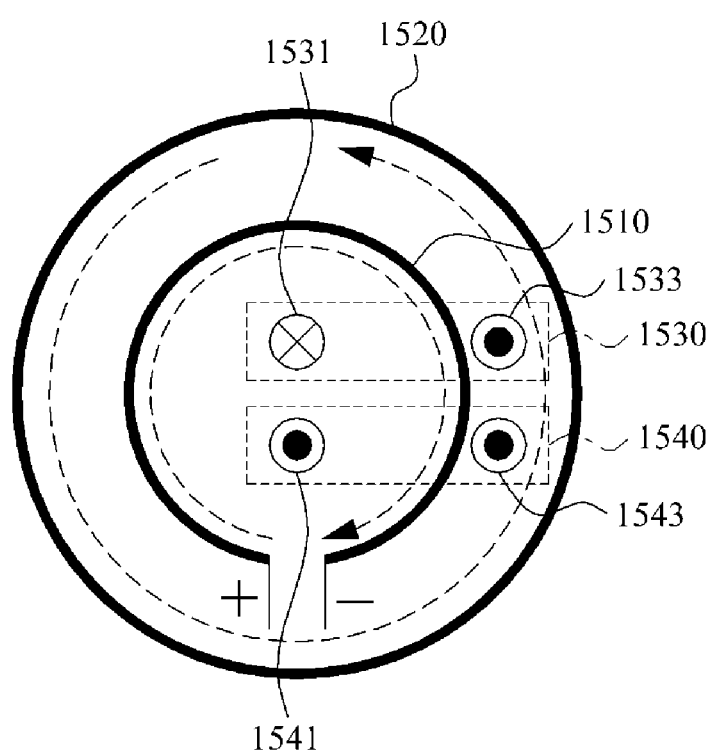
FIGS. 15A and 15B are diagrams illustrating examples of a distribution of a magnetic field in a feeder and a resonator of a wireless power transmitter.
Figure 15B:
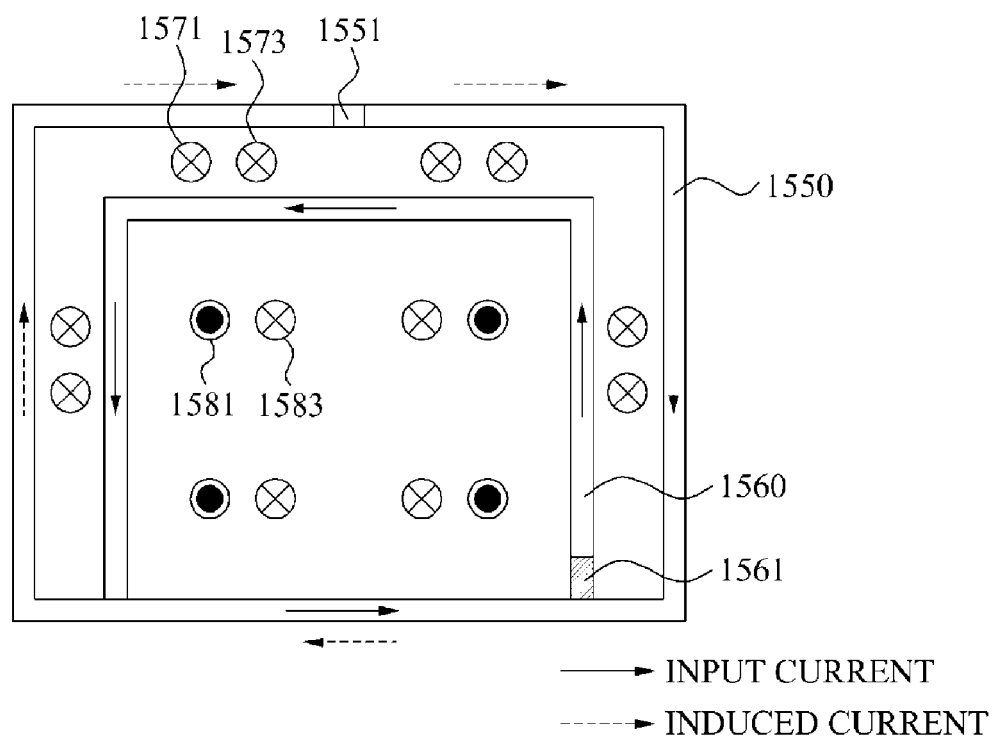

FIGS. 15A and 15B illustrate examples of a distribution of a magnetic field in a feeder and a resonator of a wireless power transmitter. When a resonator receives power supplied through a separate feeder, magnetic fields are formed in both the feeder and the resonator.

FIG. 15A is a diagram illustrating an example of a structure of a wireless power transmitter in which a feeder 1510 and a resonator 1520 do not have a common ground. Referring to FIG. 15A, when an input current flows into the feeder 1510 through a terminal labeled "+" and out of the feeder 1510 through a terminal labeled "−", a magnetic field 1530 is generated by the input current. A direction 1531 of the magnetic field 1530 inside the feeder 1510 is into the plane of FIG. 15A, and is opposite to a direction 1533 of the magnetic field 1530 outside the feeder 1510. The magnetic field 1530 generated by the feeder 1510 induces a current to flow in the resonator 1520. The direction of the induced current in the resonator 1520 is opposite to a direction of the input current in the feeder 1510 as indicated by the dashed lines with arrowheads in FIG. 15A.

The induced current in the resonator 1520 generates a magnetic field 1540. Directions of the magnetic field 1540 generated by the resonator 1520 are the same at all positions inside the resonator 1520, and are out of the plane of FIG. 15A. Accordingly, a direction 1541 of the magnetic field 1540 generated by the resonator 1520 inside the feeder 1510 is the same as a direction 1543 of the magnetic field 1540 generated by the resonator 1520 outside the feeder 1510.

Consequently, when the magnetic field 1530 generated by the feeder 1510 and the magnetic field 1540 generated by the resonator 1520 are combined, a strength of the total magnetic field inside the feeder 1510 decreases inside the feeder 1510, but increases outside the feeder 1510. In an example in which power is supplied to the resonator 1520 through the feeder 1510 configured as illustrated in FIG. 15A, the strength of the total magnetic field decreases in the center of the resonator 1520, but increases outside the resonator 1520. In another example in which a magnetic field is randomly or not uniformly distributed in the resonator 1520, performing impedance matching is difficult since an input impedance will vary frequently. Additionally, when the strength of the total magnetic field increases, the wireless power transmission efficiency increases. Conversely, when the strength of the total magnetic field decreases, the wireless power transmission efficiency decreases. Accordingly, the wireless power transmission efficiency is reduced on average when the magnetic field is randomly or not uniformly distributed in the resonator 1520 compared to when the magnetic field is uniformly distributed in the resonator 1520.

FIG. 15B illustrates an example of a structure of a wireless power transmitter in which a source resonator 1550 and a feeder 1560 have a common ground. The source resonator 1550 includes a capacitor 1551. The feeder 1560 receives a radio frequency (RF) signal via a port 1561. When the RF signal is input to the feeder 1560, an input current is generated in the feeder 1560. The input current flowing in the feeder 1560 generates a magnetic field, and a current is induced in the source resonator 1550 by the magnetic field. Additionally, another magnetic field is generated by the induced current flowing in the source resonator 1550. In this example, a direction of the input current flowing in the feeder 1560 is opposite to a direction of the induced current flowing in the source resonator 1550. Accordingly, in a region between the source resonator 1550 and the feeder 1560, a direction 1571 of the magnetic field generated by the input current is the same as a direction 1573 of the magnetic field generated by the induced current, and thus the strength of the total magnetic field increases in the region between the source resonator 1550 and the feeder 1560. Conversely, inside the feeder 1560, a direction 1581 of the magnetic field generated by the input current is opposite to a direction 1583 of the magnetic field generated by the induced current, and thus the strength of the total magnetic field decreases inside the feeder 1560. Therefore, the strength of the total magnetic field decreases in the center of the source resonator 1550, but increases outside the source resonator 1550.

An input impedance may be adjusted by adjusting an internal area of the feeder 1560. The input impedance refers to an impedance viewed in a direction from the feeder 1560 to the source resonator 1550. When the internal area of the feeder 1560 is increased, the input impedance is increased. Conversely, when the internal area of the feeder 1560 is decreased, the input impedance is decreased. However, if the magnetic field is randomly or not uniformly distributed in the source resonator 1550, a value of the input impedance may vary based on a location of a target device even if the internal area of the feeder 1560 has been adjusted to adjust the input impedance to match an output impedance of a power amplifier for a specific location of the target device. Accordingly, a separate matching network may be required to match the input impedance to an output impedance of the power amplifier. For example, when the input impedance is increased, a separate matching network may be used to match the increased input impedance to a relatively low output impedance of the power amplifier.

In an example in which a target resonator has the same configuration as the source resonator 1550, and a feeder of the target resonator has the same configuration as the feeder 1560 of the source resonator 1550, a separate matching network may still be required because a direction of a current flowing in the target resonator will be opposite to a direction of an induced current flowing in the feeder of the target resonator.

Figure 16A:
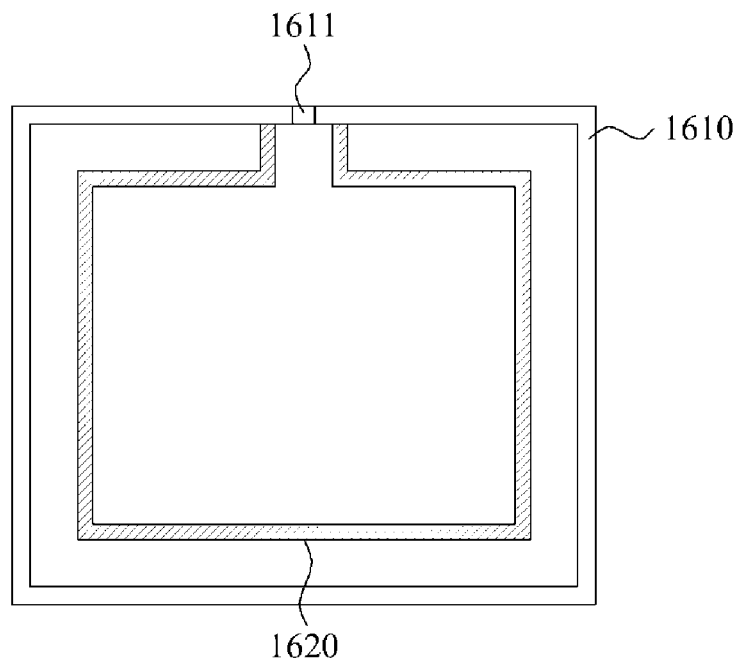
FIGS. 16A and 16B are diagrams illustrating an example of a resonator and a feeder of a wireless power transmitter.
Figure 16B:
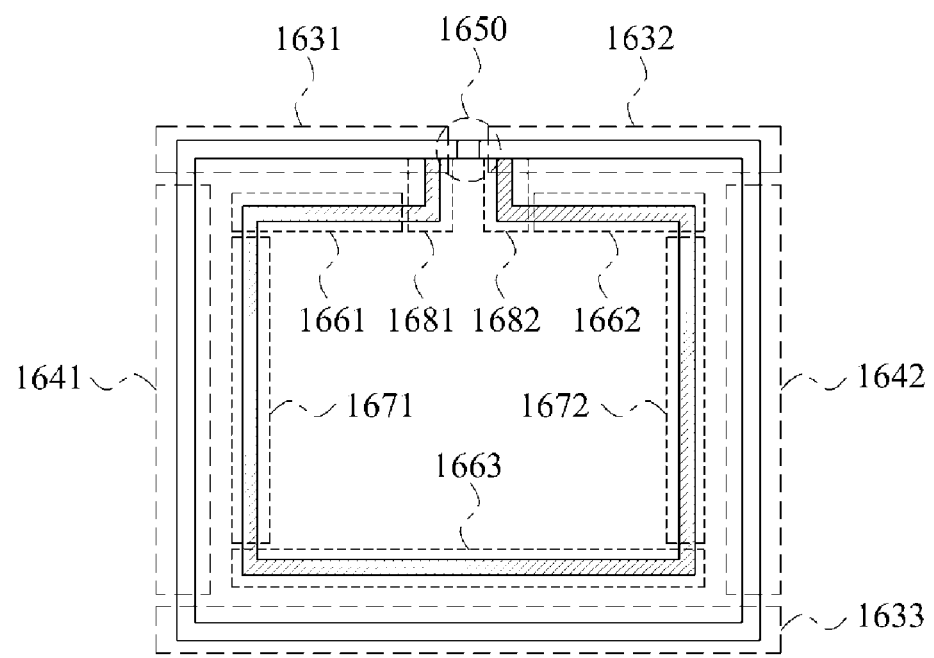

FIGS. 16A and 16B illustrate an example of a resonator and a feeder of a wireless power transmitter. Referring to FIG. 16A, the wireless power transmitter includes a resonator 1610 and a feeder 1620. The resonator 1610 includes a capacitor 1611. The feeder 1620 is electrically connected to both ends of the capacitor 1611.

FIG. 16B illustrates in greater detail a structure of the wireless power transmitter of FIG. 16A. The resonator 1610 includes a first transmission line (not identified by a reference numeral in FIG. 16B, but formed by various elements in FIG. 16B as discussed below), a first conductor 1641, a second conductor 1642, and at least one capacitor 1650.

The capacitor 1650 is inserted in series between a first signal conducting portion 1631 and a second signal conducting portion 1632, causing an electric field to be concentrated in the capacitor 1650. Generally, a transmission line includes at least one conductor in an upper portion of the transmission line, and at least one conductor in a lower portion of the transmission line. A current may flow through the at least one conductor disposed in the upper portion of the transmission line, and the at least one conductor disposed in the lower portion of the transmission line may be electrically grounded. In this example, a conductor disposed in an upper portion of the first transmission line in FIG. 16B is separated into two portions that will be referred to as the first signal conducting portion 1631 and the second signal conducting portion 1632. A conductor disposed in a lower portion of the first transmission line in FIG. 16B will be referred to as a first ground conducting portion 1633.

As illustrated in FIG. 16B, the resonator 1610 has a generally two-dimensional (2D) structure. The first transmission line includes the first signal conducting portion 1631 and the second signal conducting portion 1632 in the upper portion of the first transmission line, and includes the first ground conducting portion 1633 in the lower portion of the first transmission line. The first signal conducting portion 1631 and the second signal conducting portion 1632 are disposed to face the first ground conducting portion 1633. A current flows through the first signal conducting portion 1631 and the second signal conducting portion 1632.

One end of the first signal conducting portion 1631 is connected to one end of the first conductor 1641, the other end of the first signal conducting portion 1631 is connected to one end of the capacitor 1650, and the other end of the first conductor 1641 is connected to one end of the first ground conducting portion 1633. One end of the second signal conducting portion 1632 is connected to one end of the second conductor 1642, the other end of the second signal conducting portion 1632 is connected to the other end of the capacitor 1650, and the other end of the second conductor 1642 is connected to the other end of the first ground conducting portion 1633. Accordingly, the first signal conducting portion 1631, the second signal conducting portion 1632, the first ground conducting portion 1633, the first conductor 1641, and the second conductor 1642 are connected to each other, causing the resonator 1610 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

The capacitor 1650 is inserted into an intermediate portion of the first transmission line. In the example in FIG. 16B, the capacitor 1650 is inserted into a space between the first signal conducting portion 1631 and the second signal conducting portion 1632. The capacitor 1650 may be a lumped element capacitor, a distributed element capacitor, or any other type of capacitor known to one of ordinary skill in the art. For example, a distributed element capacitor may include zigzagged conductor lines and a dielectric material having a relatively high permittivity disposed between the zigzagged conductor lines.

The capacitor 1650 inserted into the first transmission line may cause the resonator 1610 to have a characteristic of a metamaterial. A metamaterial is a material having a predetermined electrical property that is not found in nature, and thus may have an artificially designed structure. All materials existing in nature have a magnetic permeability and permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial that has a magnetic permeability and/or a permittivity that is not found in nature may be classified into an epsilon negative (ENG) material, a mu negative (MNG) material, a double negative (DNG) material, a negative refractive index (NRI) material, a left-handed (LH) material, and any other metamaterial classification known to one of ordinary skill in the art based on a sign of the magnetic permeability of the metamaterial and a sign of the permittivity of the metamaterial.

If the capacitor 1650 is a lumped element capacitor and a capacitance of the capacitor 1650 is appropriately determined, the resonator 1610 may have a characteristic of a metamaterial. If the resonator 1610 is caused to have a negative magnetic permeability by appropriately adjusting the capacitance of the capacitor 1650, the resonator 1610 may also be referred to as an MNG resonator. Various criteria may be applied to determine the capacitance of the capacitor 1650. For example, the various criteria may include a criterion for enabling the resonator 1610 to have the characteristic of the metamaterial, a criterion for enabling the resonator 1610 to have a negative magnetic permeability at a target frequency, a criterion for enabling the resonator 1610 to have a zeroth order resonance characteristic at the target frequency, and any other suitable criterion. Based on any one or any combination of the aforementioned criteria, the capacitance of the capacitor 1650 may be appropriately determined.

The resonator 1610, hereinafter referred to as the MNG resonator 1610, may have a zeroth order resonance characteristic of having a resonant frequency when a propagation constant is "0". When the MNG resonator 1610 has the zeroth order resonance characteristic, the resonant frequency is independent of a physical size of the MNG resonator 1610. By changing the capacitance of the capacitor 1650, the resonant frequency of the MNG resonator 1610 may be changed without changing the physical size of the MNG resonator 1610.

In a near field, the electric field is concentrated in the capacitor 1650 inserted into the first transmission line, causing the magnetic field to become dominant in the near field. The MNG resonator 1610 has a relatively high Q-factor when the capacitor 1650 is a lumped element capacitor, thereby increasing a wireless power transmission efficiency. The Q-factor indicates a level of an ohmic loss or a ratio of a reactance with respect to a resistance in the wireless power transmission. As will be understood by one of ordinary skill in the art, the wireless power transmission efficiency will increase as the Q-factor increases.

Although not illustrated in FIG. 16B, a magnetic core passing through the MNG resonator 1610 may be provided to increase a wireless power transmission distance.

Referring to FIG. 16B, the feeder 1620 includes a second transmission line (not identified by a reference numeral in FIG. 16B, but formed by various elements in FIG. 16B as discussed below), a third conductor 1671, a fourth conductor 1672, a fifth conductor 1681, and a sixth conductor 1682.

The second transmission line includes a third signal conducting portion 1661 and a fourth signal conducting portion 1662 in an upper portion of the second transmission line, and includes a second ground conducting portion 1663 in a lower portion of the second transmission line. The third signal conducting portion 1661 and the fourth signal conducting portion 1662 are disposed to face the second ground conducting portion 1663. A current flows through the third signal conducting portion 1661 and the fourth signal conducting portion 1662.

One end of the third signal conducting portion 1661 is connected to one end of the third conductor 1671, the other end of the third signal conducting portion 1661 is connected to one end of the fifth conductor 1681, and the other end of the third conductor 1671 is connected to one end of the second ground conducting portion 1663. One end of the fourth signal conducting portion 1662 is connected to one end of the fourth conductor 1672, the other end of the fourth signal conducting portion 1662 is connected to one end the sixth conductor 1682, and the other end of the fourth conductor 1672 is connected to the other end of the second ground conducting portion 1663. The other end of the fifth conductor 1681 is connected to the first signal conducting portion 1631 at or near where the first signal conducting portion 1631 is connected to one end of the capacitor 1650, and the other end of the sixth conductor 1682 is connected to the second signal conducting portion 1632 at or near where the second signal conducting portion 1632 is connected to the other end of the capacitor 1650. Thus, the fifth conductor 1681 and the sixth conductor 1682 are connected in parallel with both ends of the capacitor 1650. The fifth conductor 1681 and the sixth conductor 1682 are used as an input port to receive an RF signal as an input.

Accordingly, the third signal conducting portion 1661, the fourth signal conducting portion 1662, the second ground conducting portion 1663, the third conductor 1671, the fourth conductor 1672, the fifth conductor 1681, the sixth conductor 1682, and the resonator 1610 are connected to each other, causing the resonator 1610 and the feeder 1620 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

If an RF signal is input to the fifth conductor 1681 or the sixth conductor 1682, an input current flows through the feeder 1620 and the resonator 1610, generating a magnetic field that induces a current in the resonator 1610. A direction of the input current flowing through the feeder 1620 is the same as a direction of the induced current flowing through the resonator 1610, thereby causing a strength of a total magnetic field to increase in the center of the resonator 1610, and decrease near the outer periphery of the resonator 1610.

An input impedance is determined by an area of a region between the resonator 1610 and the feeder 1620. Accordingly, a separate matching network used to match the input impedance to an output impedance of a power amplifier may not be necessary. However, if a matching network is used, the input impedance may be adjusted by adjusting a size of the feeder 1620, and accordingly a structure of the matching network may be simplified. The simplified structure of the matching network reduces a matching loss of the matching network.

The second transmission line, the third conductor 1671, the fourth conductor 1672, the fifth conductor 1681, and the sixth conductor 1682 of the feeder 1620 may have a structure that is the same as the structure of the resonator 1610. For example, if the resonator 1610 has a loop structure, the feeder 1620 may also have a loop structure. As another example, if the resonator 1610 has a circular structure, the feeder 1620 may also have a circular structure.

FIG. 17A illustrates an example of a distribution of a magnetic field inside a resonator of a wireless power transmitter produced by feeding a feeder. FIG. 17A more simply illustrates the resonator 1610 and the feeder 1620 of FIGS. 16A and 16B, and the names of the various elements in FIG. 16B will be used in the following description of FIG. 17A without reference numerals for ease of description.

A feeding operation may be an operation of supplying power to a source resonator in wireless power transmission, or an operation of supplying AC power to a rectifier in wireless power transmission. FIG. 17A illustrates a direction of input current flowing in the feeder, and a direction of an induced current flowing in the source resonator. Additionally, FIG. 17A illustrates a direction of a magnetic field generated by the input current of the feeder, and a direction of a magnetic field generated by the induced current of the source resonator.

Referring to FIG. 17A, the fifth conductor or the sixth conductor of the feeder 1620 may be used as an input port 1710. In FIG. 17A, the sixth conductor of the feeder is being used as the input port 1710. An RF signal is input to the input port 1710. The RF signal may be output from a power amplifier. The power amplifier may increase and decrease an amplitude of the RF signal based on a power requirement of a target device. The RF signal input to the input port 1710 is represented in FIG. 17A as an input current flowing in the feeder. The input current flows in a clockwise direction in the feeder along the second transmission line of the feeder. The fifth conductor and the sixth conductor of the feeder are electrically connected to the resonator. More specifically, the fifth conductor of the feeder is connected to the first signal conducting portion of the resonator, and the sixth conductor of the feeder is connected to the second signal conducting portion of the resonator. Accordingly, the input current flows in both the resonator and the feeder. The input current flows in a counterclockwise direction in the resonator along the first transmission line of the resonator. The input current flowing in the resonator generates a magnetic field, and the magnetic field induces a current in the resonator. The induced current flows in a clockwise direction in the resonator along the first transmission line of the resonator. The induced current in the resonator transfers energy to the capacitor of the resonator, and also generates a magnetic field. In FIG. 17A, the input current flowing in the feeder and the resonator is indicated by solid lines with arrowheads, and the induced current flowing in the resonator is indicated by dashed lines with arrowheads.

A direction of a magnetic field generated by a current is determined based on the right-hand rule. As illustrated in FIG. 17A, inside the feeder, a direction 1721 of the magnetic field generated by the input current flowing in the feeder is the same as a direction 1723 of the magnetic field generated by the induced current flowing in the resonator. Accordingly, a strength of the total magnetic field increases inside the feeder.

In contrast, as illustrated in FIG. 17A, in a region between the feeder and the resonator, a direction 1733 of the magnetic field generated by the input current flowing in the feeder is opposite to a direction 1731 of the magnetic field generated by the induced current flowing in the source resonator. Accordingly, the strength of the total magnetic field decreases in the region between the feeder and the resonator.

Typically, in a resonator having a loop structure, a strength of a magnetic field decreases in the center of the resonator, and increases near an outer periphery of the resonator. However, referring to FIG. 17A, since the feeder is electrically connected to both ends of the capacitor of the resonator, the direction of the induced current in the resonator is the same as the direction of the input current in the feeder. Since the direction of the induced current in the resonator is the same as the direction of the input current in the feeder, the strength of the total magnetic field increases inside the feeder, and decreases outside the feeder. As a result, due to the feeder, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Thus, the strength of the total magnetic field may be constant inside the resonator.

A wireless power transmission efficiency of transmitting wireless power from a source resonator to a target resonator is proportional to the strength of the total magnetic field generated in the source resonator. Accordingly, when the strength of the total magnetic field increases inside the source resonator, the wireless power transmission efficiency also increases.

Figure 17B:
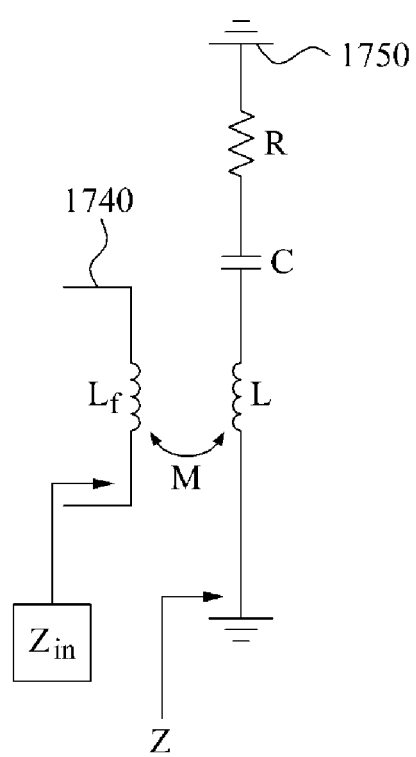
FIG. 17B is a diagram illustrating an example of equivalent circuits of a feeder and a resonator of a wireless power transmitter.

FIG. 17B illustrates an example of equivalent circuits of a feeder and a resonator of a wireless power transmitter. Referring to FIG. 17B, a feeder 1740 and a resonator 1750 may be represented by the equivalent circuits in FIG. 17B. The feeder 1740 is represented as an inductor having an inductance $L_f$, and the resonator 1750 is represented as a series connection of an inductor having an inductance L coupled to the inductance $L_f$ of the feeder 1740 by a mutual inductance M, a capacitor having a capacitance C, and a resistor having a resistance R. An example of an input impedance $Z_{in}$ viewed in a direction from the feeder 1740 to the resonator 1750 may be expressed by the following Equation 1:

$$Z_{in} = \frac{(\omega M)^2}{Z} \quad (1)$$

In Equation 1, M denotes a mutual inductance between the feeder 1740 and the resonator 1750, ω denotes a resonant frequency of the feeder 1740 and the resonator 1750, and Z denotes an impedance viewed in a direction from the resonator 1750 to a target device. As can be seen from Equation 1, the input impedance $Z_{in}$ is proportional to the square of the mutual inductance M. Accordingly, the input impedance $Z_{in}$ be adjusted by adjusting the mutual inductance M. The mutual inductance M depends on an area of a region between the feeder 1740 and the resonator 1750. The area of the region between the feeder 1740 and the resonator 1750 may be adjusted by adjusting a size of the feeder 1740, thereby adjusting the mutual inductance M and the input impedance $Z_{in}$. Since the input impedance $Z_{in}$ may be adjusted by adjusting the size of the feeder 1740, it may be unnecessary to use a separate matching network to perform impedance matching with an output impedance of a power amplifier.

In a target resonator and a feeder included in a wireless power receiver, a magnetic field may be distributed as illustrated in FIG. 17A. For example, the target resonator may receive wireless power from a source resonator via magnetic coupling. The received wireless power induces a current in the target resonator. The induced current in the target resonator generates a magnetic field, which induces a current in the feeder. If the target resonator is connected to the feeder as illustrated in FIG. 17A, a direction of the induced current flowing in the target resonator will be the same as a direction of the induced current flowing in the feeder. Accordingly, for the reasons discussed above in connection with FIG. 17A, a strength of the total magnetic field will increase inside the feeder, and will decrease in a region between the feeder and the target resonator.

Figure 18:
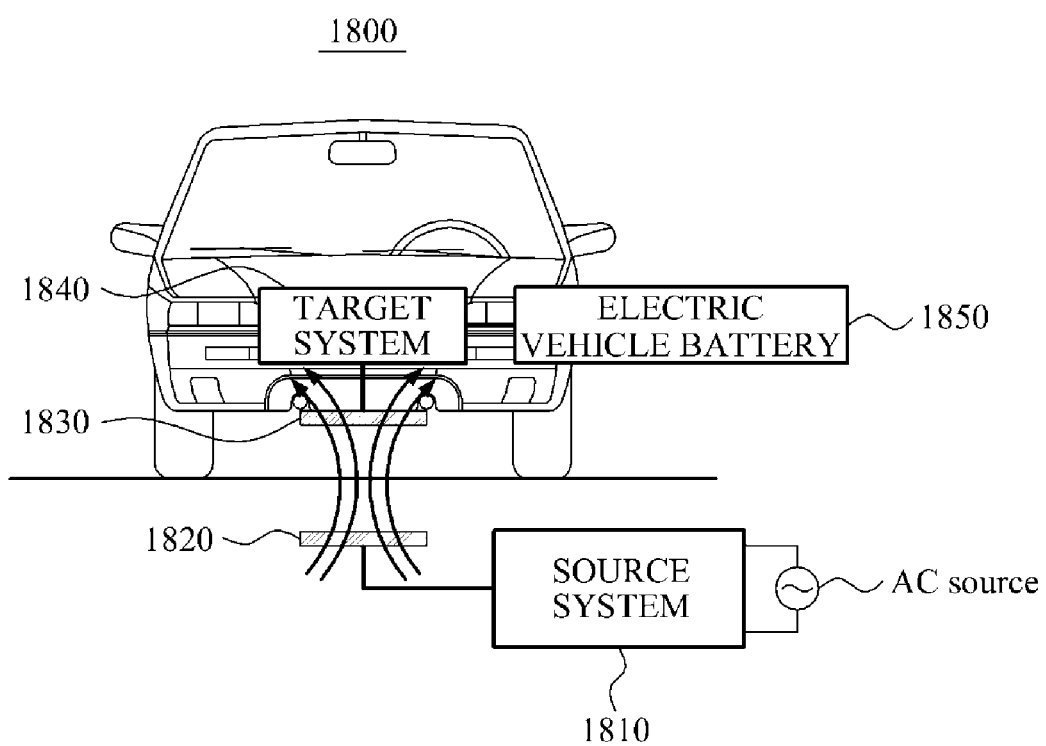
FIG. 18 is a diagram illustrating an example of an electric vehicle charging system.

FIG. 18 illustrates an example of an electric vehicle charging system. Referring to FIG. 18, an electric vehicle charging system 1800 includes a source system 1810, a source resonator 1820, a target resonator 1830, a target system 1840, and an electric vehicle battery 1850.

In one example, the electric vehicle charging system 1800 has a structure similar to the structure of the system of FIG. 3. The source system 1810 and the source resonator 1820 in the electric vehicle charging system 1800 operate as a source. The target resonator 1830 and the target system 1840 in the electric vehicle charging system 1800 operate as a target.

In one example, the source system 1810 includes a variable SMPS, a power amplifier (PA), a matching network, a TX controller, a communication unit, and a power detector similar to those of the apparatus of FIG. 1. In one example, the target system 1840 includes a matching network, a rectifier, a DC/DC converter, a communication unit, an RX controller, a voltage detector, and a power detector similar to those of the apparatus of FIG. 2. The electric vehicle battery 1850 is charged by the target system 1840. The electric vehicle charging system 1800 may use a resonant frequency in a band of a few kilohertz (kHz) to tens of MHz.

The source system 1810 generates power based on a type of the electric vehicle being charged, a capacity of the electric vehicle battery 1850, and a charging state of the electric vehicle battery 1850, and wirelessly transmits the generated power to the target system 1840 via a magnetic coupling between the source resonator 1820 and the target resonator 1830.

The source system 1810 may control an alignment of the source resonator 1820 and the target resonator 1830. For example, when the source resonator 1820 and the target resonator 1830 are not aligned with each other, the TX controller of the source system 1810 may transmit a message to the target system 1840 to control the alignment of the source resonator 1820 and the target resonator 1830.

For example, when the target resonator 1830 is not located in a position enabling maximum magnetic coupling, the source resonator 1820 and the target resonator 1830 are not properly aligned with each other. When an electric vehicle does not stop at a proper position to accurately align the source resonator 1820 and the target resonator 1830 with each other, the source system 1810 may instruct a position of the electric vehicle to be adjusted to control the source resonator 1820 and the target resonator 1830 to be aligned with each other. However, this is merely an example, and other methods of aligning the source resonator 1820 and the target resonator 1830 with each other may be used.

The source system 1810 and the target system 1840 may transmit or receive an ID of an electric vehicle and exchange various messages by communicating with each other.

The descriptions of FIGS. 1 through 17B are also applicable to the electric vehicle charging system 1800. However, the electric vehicle charging system 1800 may use a resonant frequency in a band of a few kHz to tens of MHz, and may wirelessly transmit power that is equal to or higher than tens of watts to charge the electric vehicle battery 1850.

The various units, modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus configured to transmit power and data, using mutual resonance, the apparatus comprising:
a power transmitter configured to wirelessly transmit power to a device by using a first frequency, wherein the power transmitter comprises a first source resonator configured to transmit the power to a first target resonator of the device, wherein the first target resonator of the device resonates at the first frequency;
a communication unit configured to transmit data to the device by using a second frequency, based on mutual resonance between the communication unit and the device, wherein the communication unit comprises a second source resonator configured to transmit the data to a second target resonator of the device, wherein the second target resonator of the device resonates at the second frequency, and wherein the second source resonator has an overlapped area with the first source resonator;
a controller configured to determine a charging state of the device, based on the data received from the device, and to control an amount of the power, based on the charging state; and
a filter configured to block a signal of the first frequency or the second frequency, to prevent a magnetic field from being induced between the first source resonator and the second source resonator.

2. The apparatus of claim 1, wherein the power transmitter comprises:
a first frequency generating unit configured to generate the first frequency; and
a first power amplifier (PA) configured to amplify an amplitude of a signal with the first frequency;
wherein the first source resonator is further configured to transmit power corresponding to the amplified amplitude, to the first target resonator of the device.

3. The apparatus of claim 1, wherein the communication unit comprises:
a second frequency generating unit configured to generate the second frequency;
a second PA configured to amplify an amplitude of a signal with the second frequency; and
a demodulator configured to demodulate the load-modulated data, based on a variation in the amplitude of the signal with the second frequency, in response to mutual resonance occurring between the second source resonator and the target resonator;
wherein the second source resonator is configured to receive load-modulated data from the second target resonator of the device.

4. The apparatus of claim 3, wherein:
the communication unit further comprises a modulator configured to modulate data by changing a waveform of the signal with the second frequency; and
the second source resonator is configured to transmit the modulated data to the target resonator.

5. The apparatus of claim 1, wherein the second frequency is greater than twice, or less than half, the first frequency.

6. The apparatus of claim 1, wherein:
the first source resonator comprises a higher quality factor than a quality factor of the second source resonator; and
each of the first source resonator and the second source resonator comprises a shape of a loop.

7. The apparatus of claim 6, wherein the second source resonator comprises the same shape of the loop as the shape of the loop of the first source resonator, comprises a same pattern line of the loop as a pattern line of the loop of the first source resonator, and is located within a predetermined distance from the first source resonator.

8. The apparatus of claim 1, wherein the filter is further configured to block the signal of the first frequency of the first source resonator, to prevent a magnetic field from being induced from the first source resonator to the second source resonator.

9. The apparatus of claim 1, wherein the filter is further configured to pass the signal of the second frequency of the second source resonator, to prevent a magnetic field from being induced from the first source resonator to the second source resonator.

10. The apparatus of claim 1, wherein:
the controller comprises a detector configured to detect whether or not the device exists, based on whether or not the data is received; and
the controller is configured to control the amount of the power so that wake-up power is transmitted until the device is detected to exist, and charging power is transmitted in response to the device being detected to exist.

11. An apparatus configured to receive power and data, using mutual resonance, the apparatus comprising:
a power receiver configured to wirelessly receive power from a device by using a first frequency, wherein the power receiver comprises a first target resonator configured to receive the power from a first source resonator of the device, wherein the first source resonator of the device resonates at the first frequency;
a communication unit configured to receive data from the device by using a second frequency, based on mutual resonance between the communication unit and the device, wherein the communication unit comprises a second target resonator configured to receive the data from a second source resonator of the device wherein the second source resonator of the device resonates at the second frequency, and wherein the second target resonator has an overlapped area with the first target resonator;
a controller configured to determine a charging state of a load, and determine the data to be transmitted to the device, based on the charging state; and
a filter configured to block a signal of the first frequency or the second frequency, to prevent a magnetic field from being induced between the first target resonator and the second target resonator.

12. The apparatus of claim 11, wherein the power receiver comprises:
a rectifier configured to rectify the power;
a converter configured to convert a voltage level of the rectified power to a voltage level to charge the load; and
a charging unit configured to charge the load by adjusting an amount of power with the converted voltage level, based on the charging state.

13. The apparatus of claim 11, wherein the communication unit comprises:
a modulator configured to perform load modulation on data by changing an impedance of the load, in response to mutual resonance occurring between the second target resonator and the second source resonator.

14. The apparatus of claim 13, wherein:
the second target resonator is configured to receive a communication signal from the second source resonator; and
the communication unit further comprises a demodulator configured to demodulate data, based on a change in a waveform of the communication signal.

15. The apparatus of claim 11, wherein the communication unit is further configured to transmit a charging request of the load to the device, in response to the controller being woken up by the power.

16. The apparatus of claim 11, wherein:

the first target resonator comprises a higher quality factor than a quality factor of the second target resonator; and each of the first target resonator and the second target resonator comprises a shape of a loop.

17. The apparatus of claim 16, wherein the second target resonator comprises the same shape of the loop as the shape of the loop of the first target resonator, comprises a same pattern line of the loop as a pattern line of the loop of the first target resonator, and is located within a predetermined distance from the first target resonator.

18. The apparatus of claim 16, wherein the filter is further configured to block the signal of the first frequency of the first target resonator, or pass the signal of the second frequency of the second target resonator, to prevent a magnetic field from being induced from the first target resonator to the second target resonator.

19. A method of transmitting power and data, using mutual resonance, the method comprising:

wirelessly transmitting wake-up power from a first source resonator to a device, by using a first frequency;

transmitting communication power to the device, by using a second source resonator and a second frequency, based on mutual resonance between the communication resonator and the device, wherein the second source resonator has an overlapped area with the first source resonator;

filtering a signal of the first frequency or the second frequency, to prevent a magnetic field from being induced between the first source resonator and the second source resonator;

determining a charging state of the device, based on a change in an amplitude of the transmitted communication power; and controlling an amount of charging power to be transmitted to the device, using the first frequency, based on the charging state.

20. The method of claim 19, wherein:

the determining of the charging state comprises determining whether or not the device exists, based on the change in the amplitude of the transmitted communication power; and the method further comprises wirelessly transmitting the charging power from the power transmission resonator to the device, using the first frequency, in response to determining that the device exists.

21. The method of claim 19, wherein:

the determining of the charging state comprises determining whether or not the charging of the device is completed, based on the change in the amplitude of the transmitted communication power; and the method further comprises interrupting transmission of the charging power to the device, in response to determining that the charging of the device is completed.

22. The method of claim 19, wherein the transmitting of the wake-up power and the transmitting of the communication power is performed in response to a predetermined period of time elapsing.

23. A method comprising:

wirelessly transmitting wake-up power to an apparatus, by using a first source resonator and a first frequency;

wirelessly transmitting communication power to the apparatus, by using a second source resonator and a second frequency, wherein the second source resonator has an overlapped area with the first source resonator;

filtering a signal of the first frequency or the second frequency, to prevent a magnetic field from being induced between the first source resonator and the second source resonator;

determining whether or not data is received from the apparatus; and wirelessly transmitting charging power to the apparatus, using the first frequency, in response to determining that data is received from the apparatus.

24. The method of claim 23, further comprising:

determining whether or not data, indicating that charging of the apparatus is completed, is received from the apparatus; and interrupting the transmission of the charging power, in response to determining that data is received from the apparatus, the received data indicating that the charging of the apparatus is completed.

* * * * *